US00RE42957E

(19) United States
(12) Reissued Patent
Tohi et al.

(10) Patent Number: US RE42,957 E
(45) Date of Reissued Patent: Nov. 22, 2011

(54) PROCESS FOR PRODUCING OLEFIN POLYMERS

(75) Inventors: Yasushi Tohi, Sodegaura (JP); Kenji Sugimura, Sodegaura (JP); Toshiyuki Tsutsui, Sodegaura (JP)

(73) Assignee: Mitsui Chemicals, Inc., Tokyo (JP)

(21) Appl. No.: 12/974,458

(22) PCT Filed: Mar. 30, 2005

(86) PCT No.: PCT/JP2005/006729

§ 371 (c)(1),
(2), (4) Date: Sep. 23, 2005

(87) PCT Pub. No.: WO2005/100410

PCT Pub. Date: Oct. 27, 2005

Related U.S. Patent Documents

Reissue of:
(64) Patent No.: 7,741,419
Issued: Jun. 22, 2010
Appl. No.: 10/550,021
Filed: Sep. 23, 2005

(30) Foreign Application Priority Data

Mar. 31, 2004 (JP) ..... 2004-105387

(51) Int. Cl.
*C08F 4/642* (2006.01)
*C08F 4/6592* (2006.01)
*B01J 31/22* (2006.01)

(52) U.S. Cl. ..... 526/160; 526/131; 526/165; 526/943; 502/103; 502/152

(58) Field of Classification Search ..... 526/131, 526/160, 165, 943; 502/103, 152
See application file for complete search history.

(56) References Cited

U.S. PATENT DOCUMENTS

| | | | |
|---|---|---|---|
| 5,084,534 | A | 1/1992 | Welborn, Jr. et al. |
| 6,207,774 | B1 | 3/2001 | Hasegawa et al. |
| 6,469,188 | B1 | 10/2002 | Miller et al. |
| 2006/0161013 | A1 | 7/2006 | Tohi et al. |

FOREIGN PATENT DOCUMENTS

| | | | |
|---|---|---|---|
| JP | 1-503788 | A | 12/1989 |
| JP | 5-320246 | A | 12/1993 |
| JP | 7-157508 | A | 6/1995 |
| JP | 2004-51676 | A | 2/2004 |

OTHER PUBLICATIONS

Adv. Organoment. Chem., vol. 18, p. 99, 1980.
Angew. Chem. Int. Ed. Engl., vol. 24, p. 507, 1985.
J. Am. Chem. Soc., vol. 110, pp. 6255-6256, 1988.

*Primary Examiner* — Caixia Lu
(74) *Attorney, Agent, or Firm* — Birch, Stewart, Kolasch & Birch, LLP

(57) ABSTRACT

A process for producing an olefin polymer is provided, in which ethylene and at least one kind or more of monomers selected from α-olefins are polymerized by a high temperature solution polymerization in a temperature range between 120 and 300° C., in the presence of an olefin polymerization catalyst composed of a bridged metallocene compound represented by general formula [I] described below and at least one kind or more compounds (B) selected from (b-1) an organoaluminum oxy-compound, (b-2) a compound capable of forming an ion pair in a reaction with the bridged metallocene compound mentioned above, and (b-3) an organoaluminum compound. According to the high temperature solution polymerization of the present invention, it has become possible to obtain a polymer having a high molecular weight with high polymerization activity that was so far unattainable, and when the polymer is a copolymer, it is a process for producing a high molecular weight olefin polymer with a large comonomer content, a narrow composition distribution, and a narrow molecular weight distribution.

[I]

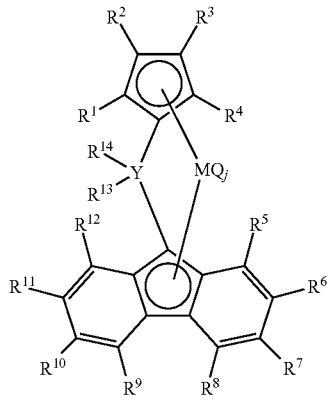

3 Claims, No Drawings

PROCESS FOR PRODUCING OLEFIN POLYMERS

Matter enclosed in heavy brackets [ ] appears in the original patent but forms no part of this reissue specification; matter printed in italics indicates the additions made by reissue.

*This is a reissue application of U.S. Pat. No. 7,741,419, which is a 371 of PCT/JP2005/06729, filed Mar. 30, 2005, which also claims priority to Japanese Application No. 2004-105387 filed in Japan on Mar. 31, 2004. The entire contents of all applications are incorporated by reference in their entirety.*

FIELD OF THE INVENTION

The present invention relates to a process for performing solution polymerization of an olefin, wherein the polymerization is carried out in the presence of a catalyst containing a metallocene compound with a specific structure in a temperature range from 120 to 300° C.

BACKGROUND OF THE INVENTION

Among the processes for producing olefin polymers such as ethylene/α-olefin copolymers, a process using a Ziegler-type titanium-based catalyst composed of a titanium compound and an organo-aluminum compound is widely known. More recently, since the publication of a process of olefin polymerization in the presence of a metallocene-based catalyst which is composed of a transition metal compound such as zirconocene and an organo-aluminum oxy-compound (hereinafter which may also be referred to as "aluminoxane" described below) as a catalyst capable of producing olefin polymers with high polymerization activity [for example, Adv. Organomet. Chem. 1899 (1980), Angew. Chem. Int. Ed. Engl., 24, 507 (1985), etc.], improvements in the catalyst and the polymerization method have been carried out continuously by many researchers in the world. However, from industrial sectors, further improvements are desired from the standpoint of the polymerization activity, achieving of higher degree of polymerization, the amount of a comonomer introduced, or stereoregularity. Methods for solving such problems may be divided largely into two methods, that is, development of a new catalyst and improvement of polymerization conditions.

In the area of new catalyst development, olefin polymerization using a metallocene compound with a new, hithereto unknown structure that was bridged with a cyclopentadienyl ligand and a fluorenyl ligand was disclosed for the first time by J. A. Ewen [J. Am. Chem. Soc., 110, 6255 (1988)], and contributed significantly to the solution of the problem described above. On the other hand, as an example in the area of improvement of polymerization conditions, a process for producing an ethylene/1-hexene copolymer with a relatively high density by performing copolymerization using a metallocene compound containing a cyclopentadienyl group as a ligand under the conditions of high pressure and high temperature was disclosed [Japanese Patent Publication No. H01-503788]. Further, in Japanese Patent Publication No. H05-320246, a process for producing an ethylene/1-octene copolymer at high temperature using cyclopentadienylzirconium chloride and dimethylaniliniumtetra(pentafluorophenyl)borate was disclosed. However, in these disclosed processes, there was a problem that it was difficult to obtain a polymer with a high molecular weight in the low-density region (that is, in the region where the comonomer content is large). Also, further improvement in terms of polymerization activity is desired.

DISCLOSURE OF THE INVENTION

The present invention was completed in order to solve the problems described above, and an object of the invention is to provide a process for producing a polymer having a high molecular weight with high polymerization activity that was so far unattainable, and when the polymer is a copolymer, it is to provide a process for producing a high molecular weight olefin polymer having a large comonomer content, a narrow composition distribution, and a narrow molecular weight distribution.

That is, the present invention is a process for producing an olefin polymer characterized by carrying out solution polymerization of ethylene and one or more kinds of monomers selected from α-olefins at the temperature ranging from 120 to 300° C., in the presence of a catalyst for olefin polymerization composed of:

(A) a bridged metallocene compound represented by general formula [I] described below, and (B) one or more kinds of the compounds selected from the group consisting of (b-1) an organoaluminum oxy-compound, (b-2) a compound which forms an ion pair in a reaction with the bridged metallocene compound (A), and (b-3) an organoaluminum compound.

[I]

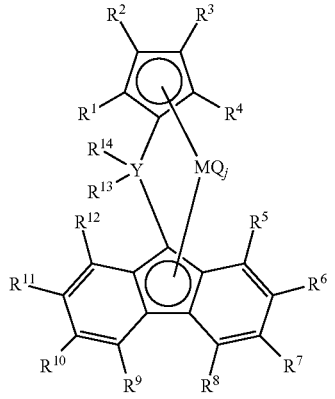

(wherein $R^1$, $R^2$, $R^3$, $R^4$, $R^5$, $R^8$, $R^9$, and $R^{12}$ are each selected from hydrogen atom, hydrocarbon group, and silicon-containing group, and may be identical or different, or neighboring groups may be combined to form a ring structure; $R^6$ and $R^{11}$ are each identical atoms or identical groups selected from hydrogen, hydrocarbon group, and silicon-containing group[, and may be combined to form a ring structure]; $R^7$ and $R^{10}$ are each identical atoms or identical groups selected from hydrogen, hydrocarbon group, and silicon-containing group[, and may be combined to form a ring structure]; *$R^6$ and $R^7$ may be combined to form a ring structure; $R^{10}$ and $R^{11}$ may be combined to form a ring structure;* $R^6$, $R^7$, $R^{10}$ and $R^{11}$ are not simultaneously hydrogen atoms; $R^{13}$ and $R^{14}$ are each aryl group, and may be identical or different; M represents Ti, Zr or Hf, and is preferably Zr or Hf; Y represents carbon or silicon; Q represents halogen, hydrocarbon group, anionic ligand, or a lone electron pair, and may be selected in an identical or different combination of neutral ligands capable of coordination; and j is an integer of 1 to 4.)

BEST MODE FOR CARRYING OUT THE INVENTION

The present invention provides a process, in the presence of a catalyst for olefin polymerization composed of:

(A) a bridged metallocene compound represented by general formula [I] mentioned above, and (B) one or more kinds of the compounds selected from the group consisting of (b-1) an organoaluminum oxy-compound, (b-2) a compound which forms an ion pair in a reaction with the bridged metallocene compound (A), and (b-3) an organoaluminum compound, for producing an olefin polymer having a high molecular weight with useful properties in various industrial sectors, such as various forms in films and the like, by carrying out solution polymerization of ethylene and one or more kinds of monomers selected from α-olefins at the temperature ranging from 120 to 300° C. in the presence of a solvent (hereinafter which also may be referred to as "high temperature solution polymerization"). In the following, a bridged metallocene compound of the present invention, an olefin polymerization catalyst containing the bridged metallocene compound, a method for carrying out high temperature solution polymerization in the presence of the olefin polymerization catalyst, and characteristics of a polymer obtained by the high temperature solution polymerization will be explained successively in terms of the best mode of carrying out the invention.

[1] (A) Bridged Metallocene Compound (A) The bridged metallocene compound represented by the general formula [I] mentioned above has the following characteristics of the chemical structure, [m1] to [m3].

[m1] Of the two ligands, one ligand is cyclopentadienyl group, and the other ligand is fluorenyl group having substituents (hereinafter which may also be referred to as "substituted fluorenyl group").

[m2] The two ligands are linked by a covalent-bond bridge which contains a carbon atom or a silicon atom having an aryl group (hereinafter which may also be referred to as "aryl group-containing covalent-bond bridge").

[m3] The transition metal (M) that composes the metallocene compound is titanium, zirconium, or hafnium.

In the following, the characteristics of the chemical structure of the metallocene compound of the present invention, that is, cyclopentadienyl group, fluorenyl group, bridge group, and other characteristics, will be explained successively; preferable bridged metallocene compounds that have all these characteristics will then be explained with examples; and finally the high temperature solution polymerization of the present invention using the bridged metallocene compounds will be explained.

Cyclopentadienyl Group

Cyclopentadienyl group may or may not be substituted. Cyclopentadienyl group which may not be substituted refers to the cyclopentadienyl group in which $R^1$, $R^2$, $R^3$, and $R^4$ that belong to the cyclopentadienyl group part of the general formula [I] mentioned above are all hydrogen atoms; or the cyclopentadienyl group of which one or more among $R^1$, $R^2$, $R^3$, and $R^4$ is substituted with hydrocarbon group (f1), preferably hydrocarbon group having the total number of carbon atoms of 1 to 20 (f1'), or with silicon-containing group (f2), or preferably silicon-containing group having the total number of carbon atoms of 1 to 20 (f2'). In the case where 2 or more among $R^1$, $R^2$, $R^3$, and $R^4$ are substituted, these substituents may be each identical or different. Further, The hydrocarbon groups having the total number of carbon atoms of 1 to 20 refer to alkyl, alkenyl, alkynyl, and aryl groups that are composed of carbon and hydrogen only. Among them, those in which neighboring hydrogen atoms are both substituted to form alicyclic group or aromatic group are included. The hydrocarbon groups having the total number of carbon atoms of 1 to 20 include, in addition to alkyl, alkenyl, alkynyl, and aryl groups that are composed of carbon and hydrogen only, heteroatom-containing hydrocarbon groups in which a part of hydrogen atoms directly bonded to these carbon atoms are substituted with halogen atom, oxygen-containing group, nitrogen-containing group, or silicon-containing group, or groups in which neighboring hydrogen atoms form alicyclic group. Specific examples of the group (f1') include straight-chain hydrocarbon groups such as methyl group, ethyl group, n-propyl group, allyl group, n-butyl group, n-pentyl group, n-hexyl group, n-heptyl group, n-octyl group, n-nonyl group, n-decanyl group and the like; branched-chain hydrocarbon groups such as isopropyl group, t-butyl group, amyl group, 3-methylpentyl group, 1,1-diethylpropyl group, 1,1-dimethylbutyl group, 1-methyl-1-propylbutyl group, 1,1-propylbutyl group, 1,1-dimethyl-2-methylpropyl group, 1-methyl-1-isopropyl-2-methylpropyl group and the like; cyclic saturated hydrocarbon groups such as cyclopentyl group, cyclohexyl group, cycloheptyl group, cyclooctyl group, norbornyl group, adamantyl group and the like; cyclic unsaturated hydrocarbon groups such as phenyl group, naphthyl group, biphenyl group, phenanthryl group, anthracenyl group and the like, and those in which the aromatic ring is substituted with alkyl groups; saturated hydrocarbon groups that are substituted with aryl-group such as benzyl group, cumyl group and the like; and heteroatom-containing hydrocarbon groups such as methoxy group, ethoxy group, phenoxy group, N-methylamino group, trifluoromethyl group, tribromomethyl group, pentafluoroethyl group, pentafluorophenyl group and the like.

The silicon-containing groups (f2) refer, for example, to groups in which the ring-carbon of cyclopentadienyl group is directly bonded with a covalent bond to silicon atom, and specifically to alkylsilyl groups and arylsilyl groups. Examples of the silicon-containing groups having the total number of carbon atoms of 1 to 20 (f2') include trimethylsilyl group, triphenylsilyl group and the like.

Substituted Fluorenyl Group

The important points of the fluorenyl group part in the chemical structure represented by general formula of [I] used in the present invention described above are the following: $R^6$ and $R^{11}$ in the general formula [I] mentioned above are each identical atoms or identical groups selected from hydrogen, hydrocarbon group (f1), or silicon-containing group (f2)[, and may be combined to form a ring]; $R^7$ and $R^{10}$ are each identical atoms or identical groups selected from hydrogen, hydrocarbon group (f1), or silicon-containing group (f2)[, and may be combined to form a ring]; *$R^6$ and $R^7$ may be combined to form a ring structure; $R^{10}$ and $R^{11}$ may be combined to form a ring structure;* and $R^6$, $R^7$, $R^{10}$, and $R^{11}$ are not simultaneously hydrogen atoms. From the viewpoint of the polymerization activity in the high temperature solution polymerization of the present invention, it is preferable that none of $R^6$ and $R^{11}$ are hydrogen atoms; it is preferable that none of $R^6$, $R^7$, $R^{10}$ and $R^{11}$ are hydrogen atoms; and it is particularly preferable that $R^6$ and $R^{11}$ are identical group selected from hydrocarbon groups and silicon-containing groups, and that $R^7$ and $R^{10}$ are an identical group selected from hydrocarbon groups and silicon-containing group. The preferable hydrocarbon groups (f1) are the hydrocarbon groups (f1') mentioned above, having the total number of carbon atoms of 1 to 20, and the preferable examples of silicon-containing groups (f2) are the silicon-containing groups (f2'), mentioned above, having the total number of carbon atoms of 1 to 20.

Aryl Group-containing Covalent-bond Bridge

The main chain part of the bond linking cyclopentadienyl group and fluorenyl group is a divalent covalent-bond bridge that contains a carbon atom or a silicon atom. The important point of the high temperature polymerization of the present invention is that the bridging atom Y of the covalent-bond bridge part has aryl groups [$R^{13}$ and $R^{14}$] that may be each identical or different. It was found for the first time that, when aryl groups that may be each identical or different are introduced into the bridging atom (Y), a high molecular olefin polymer is produced efficiently in the high temperature polymerization of the present invention, which was not achieved in the conventional solution polymerization. Specific examples of the aryl groups include phenyl group, naphthyl group, anthracenyl group, and groups in which one or more of the aromatic hydrogen atoms ($sp^2$ type hydrogen) is substituted with substituents. In addition, the substituents include the hydrocarbon groups having the total number of carbon atoms of 1 to 20 (f1') mentioned above, the silicon-containing groups having the total number of carbon atoms of 1 to 20 (f2') mentioned above, and halogen atoms. More preferable aryl groups include phenyl group, tolyl group, t-butylphenyl group, dimethylphenyl group, biphenyl group, cyclohexylphenyl group, (trifluoromethyl)phenyl group, bis(trifluoromethyl)phenyl group, and those having halogen atoms introduced in the substituents such as chlorophenyl group, dichlorophenyl group and the like. Substituted phenyl groups having these substituents at meta- and/or para-positions are particularly favorable. Further, in the bridged metallocene compounds of the present invention, those having identical $R^{13}$ and $R^{14}$ are used preferably because of easy production. As will be described later, when Y is silicon atom, as the component (B) that is a component composing the olefin polymerization catalyst of the present invention, (b-1) an organo-aluminum oxy-compound and/or (b-3) an organo-aluminum compound are used, but (b-2) a compound which forms an ion pair by reacting with the bridged metallocene compound (A) mentioned above is not used.

Other Characteristics of the Bridged Metallocene Compound

In the general formula [I] mentioned above, Q is selected in an identical or different combination from halogen; hydrocarbon group having 1 to 10 carbon atoms; neutral, conjugated or non-conjugated diene having 10 or less carbon atoms; anionic ligand; and neutral ligand capable of coordinating with a lone electron pair. Specific examples of halogen are fluorine, chlorine, bromine, and iodine; and specific examples of hydrocarbon group include methyl, ethyl, n-propyl, isopropyl, 2-methylpropyl, 1,1-dimethylpropyl, 2,2-dimethylpropyl, 1,1-diethylpropyl, 1-ethyl-1-methylpropyl, 1,1,2,2-tetramethylpropyl, sec-butyl, tert-butyl, 1,1-dimethylbutyl, 1,1,3-trimethylbutyl, neopentyl, cyclohexylmethyl, cyclohexyl, 1-methyl-1-cyclohexyl, and the like. Specific examples of neutral, conjugated, or non-conjugated diene having 10 or less carbon atoms include s-cis- or s-trans-$\eta^4$-1,3-butadiene, s-cis- or s-trans-$\eta^4$-1,4-diphenyl-1,3-butadiene, s-cis- or s-trans-$\eta^4$-3-methyl-1,3-pentadiene, s-cis- or s-trans-$\eta^4$-1,4-dibenzyl-1,3-butadiene, s-cis- or s-trans-$\eta^4$-2,4-hexadiene, s-cis- or s-trans-$\eta^4$-1,3-pentadiene, s-cis- or s-trans-$\eta^4$-1,4-ditolyl-1,3-butadiene, s-cis- or s-trans-$\eta^4$-1,4-bis(trimethylsilyl)-1,3-butadiene, and the like. Specific examples of anionic ligand include alkoxy group such as methoxy, tert-butoxy, phenoxy, and the like; carboxylate group such as acetate, benzoate and the like; and sulfonate group such as mesylate, tosylate and the like. Specific examples of neutral ligand capable of coordinating with a lone electron pair include organo-phosphorous compounds such as trimethylphosphine, triethylphosphine, triphenylphosphine, diphenylmethylphosphine and the like; or ethers such as tetrahydrofuran, diethyl ether, dioxane, 1,2-dimethoxyethane and the like. j is an integer of 1 to 4, and when j is 2 or more, Q may be each identical or different.

Preferable Bridged Metallocene Compounds and their Examples

In the following, specific examples of Group 4 transition metal compounds represented by the general formula [I] mentioned above are shown. However, the scope of the present invention is by no means limited to these examples. In addition, in the exemplified compounds, octamethyloctahydrodibenzofluorene refers to compounds having a structure represented by formula [II], octamethyltetrahydrodicyclopentafluorene refers to compounds having a structure represented by formula [III], dibenzofluorene refers to compounds having a structure represented by formula [IV], 1,1',3,6,8,8'-hexamethyl-2,7-dihydrodicyclopentafluorenyl refers to compounds having a structure represented by formula [V], and 1,3,3',6,6',8-hexamethyl-2,7-dihydrodicyclopentafluorenyl refers to compounds having a structure represented by formula [VI].

[II]

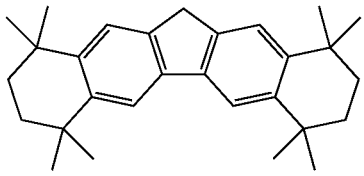

[III]

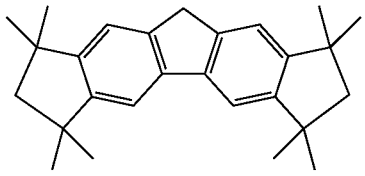

[IV]

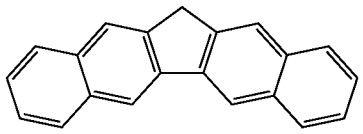

[V]

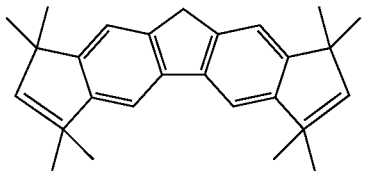

[VI]

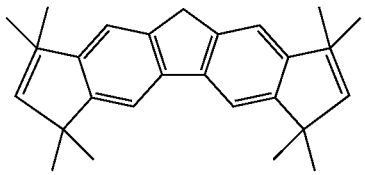

The examples are the following: diphenylmethylene (cyclopentadienyl)(2,7-di-tert-butylfluorenyl)zirconiumdichloride, diphenylmethylene(cyclopentadienyl)(3,6-di-tert-butylfluorenyl)zirconiumdichloride, diphenylmethylene (cyclopentadienyl)(octamethyloctahydrodibenzofluorenyl) zirconiumdichloride, diphenylmethylene(cyclopentadienyl) (octamethyltetrahydrodicyclopentafluorenyl) zirconiumdichloride, diphenylmethylene(cyclopentadienyl) (dibenzofluorenyl)zirconiumdichloride, diphenylmethylene (cyclopentadienyl)(1,1',3,6,8,8'-hexamethyl-2,7-dihydrodicyclopentafluorenyl)zirconiumdichloride, diphenylmethylene(cyclopentadienyl)(1,3,3',6,6',8-hexamethyl-2,7-dihydrodicyclopentafluorenyl)zirconiumdichloride, diphenylmethylene(cyclopentadienyl)(2,7-diphenyl-3,6-di-tert-butylfluorenyl)zirconiumdichloride, diphenylmethylene(cyclopentadienyl)(2,7-dimethyl-3,6-di-tert-butylfluorenyl)zirconiumdichloride, diphenylmethylene (cyclopentadienyl)(2,7-(trimethylphenyl)-3,6-di-tert-butylfluorenyl)zirconiumdichloride, diphenylmethylene (cyclopentadienyl)(2,7-(dimethylphenyl)-3,6-di-tert-butylfluorenyl)zirconiumdichloride, diphenylmethylene (cyclopentadienyl)(2,3,6,7-tetra-tert-butylfluorenyl) zirconiumdichloride, di(p-tolyl)methylene (cyclopentadienyl)(2,7-di-tert-butylfluorenyl) zirconiumdichloride, di(p-tolyl)methylene (cyclopentadienyl)(3,6-di-tert-butylfluorenyl) zirconiumdichloride, di(p-tolyl)methylene (cyclopentadienyl)(octamethyloctahydrodibenzofluorenyl) zirconiumdichloride, di(p-tolyl)methylene (cyclopentadienyl) (octamethyltetrahydrodicyclopentafluorenyl) zirconiumdichloride, di(p-tolyl)methylene (cyclopentadienyl)(dibenzofluorenyl)zirconiumdichloride, di(p-tolyl)methylene(cyclopentadienyl)(1,1',3,6,8,8'-hexamethyl-2,7-dihydrodicyclopentafluorenyl)zirconiumdichloride, di(p-tolyl)methylene(cyclopentadienyl)(1,3,3',6,6',8-hexamethyl-2,7-dihydrodicyclopentafluorenyl) zirconiumdichloride, di(p-tolyl)methylene (cyclopentadienyl)(2,7-diphenyl-3,6-di-tert-butylfluorenyl) zirconiumdichloride, di(p-tolyl)methylene (cyclopentadienyl)(2,7-dimethyl-3,6-di-tert-butylfluorenyl) zirconiumdichloride, di(p-tolyl)methylene (cyclopentadienyl)(2,7-(trimethylphenyl)-3,6-di-tert-butylfluorenyl)zirconiumdichloride, di(p-tolyl)methylene (cyclopentadienyl)(2,7-(dimethylphenyl)-3,6-di-tert-butylfluorenyl)zirconiumdichloride, di(p-tolyl)methylene (cyclopentadienyl)(2,3,6,7-tetra-tert-butylfluorenyl) zirconiumdichloride, di(p-chlorophenyl)methylene (cyclopentadienyl)(2,7-di-tert-butylfluorenyl) zirconiumdichloride, di(p-chlorophenyl)methylene (cyclopentadienyl)(3,6-di-tert-butylfluorenyl) zirconiumdichloride, di(p-chlorophenyl)methylene (cyclopentadienyl)(octamethyloctahydrodibenzofluorenyl) zirconiumdichloride, di(p-chlorophenyl)methylene (cyclopentadienyl) (octamethyltetrahydrodicyclopentafluorenyl) zirconiumdichloride, di(p-chlorophenyl)methylene (cyclopentadienyl)(dibenzofluorenyl)zirconiumdichloride, di(p-chlorophenyl)methylene(cyclopentadienyl)(1,1',3,6,8,8'-hexamethyl-2,7-dihydrodicyclopentafluorenyl)zirconiumdichloride, di(p-chlorophenyl)methylene(cyclopentadienyl)(1,3,3',6,6',8-hexamethyl-2,7-dihydrodicyclopentafluorenyl)zirconiumdichloride, di(p-chlorophenyl)methylene(cyclopentadienyl)(2,7-diphenyl-3,6-di-tert-butylfluorenyl)zirconiumdichloride, di(p-chlorophenyl)methylene(cyclopentadienyl)(2,7-dimethyl-3,6-di-tert-butylfluorenyl)zirconiumdichloride, di(p-chlorophenyl)methylene(cyclopentadienyl)(2,7-(trimethylphenyl)-3,6-di-tert-butyl fluorenyl) zirconiumdichloride, di(p-chlorophenyl)methylene (cyclopentadienyl)(2,7-(dimethylphenyl)-3,6-di-tert-butylfluorenyl)zirconiumdichloride, di(p-chlorophenyl) methylene(cyclopentadienyl)(2,3,6,7-tetra-tert-butylfluorenyl)zirconiumdichloride, di(m-chlorophenyl) methylene(cyclopentadienyl)(2,7-di-tert-butylfluorenyl) zirconiumdichloride, di(m-chlorophenyl)methylene (cyclopentadienyl)(3,6-di-tert-butylfluorenyl) zirconiumdichloride, di(m-chlorophenyl)methylene (cyclopentadienyl)(octamethyloctahydrodibenzofluorenyl) zirconiumdichloride, di(m-chlorophenyl)methylene (cyclopentadienyl) (octamethyltetrahydrodicyclopentafluorenyl) zirconiumdichloride, di(m-chlorophenyl)methylene (cyclopentadienyl)(dibenzofluorenyl)zirconiumdichloride, di(m-chlorophenyl)methylene(cyclopentadienyl)(1,1',3,6,8,8'-hexamethyl-2,7-dihydrodicyclopentafluorenyl)zirconiumdichloride, di(m-chlorophenyl)methylene(cyclopentadienyl)(1,3,3',6,6',8-hexamethyl-2,7-dihydrodicyclopentafluorenyl)zirconiumdichloride, di(m-chlorophenyl)methylene(cyclopentadienyl)(2,7-diphenyl-3,6-di-tert-butylfluorenyl)zirconiumdichloride, di(m-chlorophenyl)methylene(cyclopentadienyl)(2,7-dimethyl-3,6-di-tert-butylfluorenyl)zirconiumdichloride, di(m-chlorophenyl)methylene(cyclopentadienyl)(2,7-(trimethylphenyl)-3,6-di-tert-butylfluorenyl) zirconiumdichloride, di(m-chlorophenyl)methylene (cyclopentadienyl)(2,7-(dimethylphenyl)-3,6-di-tert-butylfluorenyl)zirconiumdichloride, di(m-chlorophenyl) methylene(cyclopentadienyl)(2,3,6,7-tetra-tert-butylfluorenyl)zirconiumdichloride, di(p-bromophenyl) methylene(cyclopentadienyl)(2,7-di-tert-butylfluorenyl) zirconiumdichloride, di(p-bromophenyl)methylene (cyclopentadienyl)(3,6-di-tert-butylfluorenyl) zirconiumdichloride, di(p-bromophenyl)methylene (cyclopentadienyl)(octamethyloctahydrodibenzofluorenyl) zirconiumdichloride, di(p-bromophenyl)methylene (cyclopentadienyl) (octamethyltetrahydrodicyclopentafluorenyl) zirconiumdichloride, di(p-bromophenyl)methylene (cyclopentadienyl)(dibenzofluorenyl)zirconiumdichloride, di(p-bromophenyl)methylene(cyclopentadienyl)(1,1',3,6,8,8'-hexamethyl-2,7-dihydrodicyclopentafluorenyl)zirconiumdichloride, di(p-bromophenyl)methylene(cyclopentadienyl)(1,3,3',6,6',8-hexamethyl-2,7-dihydrodicyclopentafluorenyl)zirconiumdichloride, di(p-bromophenyl)methylene(cyclopentadienyl)(2,7-diphenyl-3,6-di-tert-butylfluorenyl)zirconiumdichloride, di(p-bromophenyl)methylene(cyclopentadienyl)(2,7-dimethyl-3,6-di-tert-butylfluorenyl)zirconiumdichloride, di(p-bromophenyl)methylene(cyclopentadienyl)(2,7-(trimethylphenyl)-3,6-di-tert-butylfluorenyl) zirconiumdichloride, di(p-bromophenyl)methylene (cyclopentadienyl)(2,7-(dimethylphenyl)-3,6-di-tert-butylfluorenyl)zirconiumdichloride, di(p-bromophenyl) methylene(cyclopentadienyl)(2,3,6,7-tetra-tert-butylfluorenyl)zirconiumdichloride, di(m-trifluoromethyl-phenyl)methylene(cyclopentadienyl)(2,7-di-tert-butylfluorenyl)zirconiumdichloride, di(m-trifluoromethyl-phenyl)methylene(cyclopentadienyl)(3,6-di-tert-butylfluorenyl)zirconiumdichloride, di(m-trifluoromethyl-phenyl)methylene(cyclopentadienyl) (octamethyloctahydrodibenzofluorenyl) zirconiumdichloride, di(m-trifluoromethyl-phenyl) methylene(cyclopentadienyl) (octamethyltetrahydrodicyclopentafluorenyl) zirconiumdichloride, di(m-trifluoromethyl-phenyl)

methylene(cyclopentadienyl)(dibenzofluorenyl)zirconium-dichloride, di(m-trifluoromethyl-phenyl)methylene (cyclopentadienyl)(1,1',3,6,8,8'-hexamethyl-2,7-dihydrodicyclopentafluorenyl)zirconiumdichloride, di(m-trifluoromethylphenyl)methylene(cyclopentadienyl)(1,3,3',6,6',8-hexamethyl-2,7-dihydrodicyclopentafluorenyl) zirconiumdichloride, di(m-trifluoromethyl-phenyl) methylene(cyclopentadienyl)(2,7-diphenyl-3,6-di-tert-butylfluorenyl)zirconiumdichloride, di(m-trifluoromethyl-phenyl)methylene(cyclopentadienyl)(2,7-dimethyl-3,6-di-tert-butylfluorenyl)zirconiumdichloride, di(m-trifluoromethyl-phenyl)methylene(cyclopentadienyl)(2,7-(trimethylphenyl)-3,6-di-tert-butylfluorenyl) zirconiumdichloride, di(m-trifluoromethyl-phenyl) methylene(cyclopentadienyl)(2,7-(dimethylphenyl)-3,6-di-tert-butylfluorenyl)zirconiumdichloride, di(m-trifluoromethyl-phenyl)methylene(cyclopentadienyl)(2,3,6,7-tetra-tert-butylfluorenyl)zirconiumdichloride, di(p-trifluoromethyl-phenyl)methylene(cyclopentadienyl)(2,7-di-tert-butylfluorenyl)zirconiumdichloride, di(p-trifluoromethyl-phenyl)methylene(cyclopentadienyl)(3,6-di-tert-butylfluorenyl)zirconiumdichloride, di(p-trifluoromethylphenyl)methylene(cyclopentadienyl) (octamethyloctahydrodibenzofluorenyl) zirconiumdichloride, di(p-trifluoromethyl-phenyl) methylene(cyclopentadienyl) (octamethyltetrahydrodicyclopentafluorenyl) zirconiumdichloride, di(p-trifluoromethyl-phenyl) methylene(cyclopentadienyl)(dibenzofluorenyl) zirconiumdichloride, di(p-trifluoromethyl-phenyl) methylene(cyclopentadienyl)(1,1',3,6,8,8'-hexamethyl-2,7-dihydrodicyclopentafluorenyl)zirconiumdichloride, di(p-trifluoromethylphenyl)methylene(cyclopentadienyl)(1,3,3',6,6',8-hexamethyl-2,7-dihydrodicyclopentafluorenyl) zirconiumdichloride, di(p-trifluoromethyl-phenyl) methylene(cyclopentadienyl)(2,7-diphenyl-3,6-di-tert-butyl fluorenyl)zirconiumdichloride, di(p-trifluoromethyl-phenyl) methylene(cyclopentadienyl)(2,7-dimethyl-3,6-di-tert-butyl fluorenyl)zirconiumdichloride, di(p-trifluoromethyl-phenyl) methylene(cyclopentadienyl)(2,7-(trimethylphenyl)-3,6-di-tert-butylfluorenyl)zirconiumdichloride, di(p-trifluoromethyl-phenyl)methylene(cyclopentadienyl)(2,7-(dimethylphenyl)-3,6-di-tert-butylfluorenyl) zirconiumdichloride, di(p-trifluoromethyl-phenyl) methylene(cyclopentadienyl)(2,3,6,7-tetra-tert-butylfluorenyl)zirconiumdichloride, di(p-tert-butyl-phenyl) methylene(cyclopentadienyl)(2,7-di-tert-butylfluorenyl) zirconiumdichloride, di(p-tert-butyl-phenyl)methylene (cyclopentadienyl)(3,6-di-tert-butylfluorenyl) zirconiumdichloride, di(p-tert-butyl-phenyl)methylene (cyclopentadienyl)(octamethyloctahydrodibenzofluorenyl) zirconiumdichloride, di(p-tert-butyl-phenyl)methylene (cyclopentadienyl) (octamethyltetrahydrodicyclopentafluorenyl) zirconiumdichloride, di(p-tert-butyl-phenyl)methylene (cyclopentadienyl)(dibenzofluorenyl)zirconiumdichloride, di(p-tert-butyl-phenyl)methylene(cyclopentadienyl)(1,1',3,6,8,8'-hexamethyl-2,7-dihydrodicyclopentafluorenyl)zirconiumdichloride, di(p-tert-butyl-phenyl)methylene(cyclopentadienyl)(1,3,3',6,6',8-hexamethyl-2,7-dihydrodicyclopentafluorenyl)zirconiumdichloride, di(p-tert-butyl-phenyl)methylene(cyclopentadienyl)(2,7-diphenyl-3,6-di-tert-butylfluorenyl)zirconiumdichloride, di(p-tert-butyl-phenyl)methylene(cyclopentadienyl)(2,7-dimethyl-3,6-di-tert-butylfluorenyl)zirconiumdichloride, di(p-tert-butyl-phenyl)methylene(cyclopentadienyl)(2,7-(trimethylphenyl)-3,6-di-tert-butyl fluorenyl)zirconium-dichloride, di(p-tert-butyl-phenyl)methylene(cyclopentadienyl)(2,7-(dimethylphenyl)-3,6-di-tert-butyl fluorenyl) zirconiumdichloride, di(p-tert-butyl-phenyl)methylene (cyclopentadienyl)(2,3,6,7-tetra-tert-butylfluorenyl) zirconiumdichloride, di(p-n-butyl-phenyl)methylene (cyclopentadienyl)(2,7-di-tert-butylfluorenyl) zirconiumdichloride, di(p-n-butyl-phenyl)methylene (cyclopentadienyl)(3,6-di-tert-butylfluorenyl) zirconiumdichloride, di(p-n-butyl-phenyl)methylene (cyclopentadienyl)(octamethyloctahydrodibenzofluorenyl) zirconiumdichloride, di(p-n-butyl-phenyl)methylene (cyclopentadienyl) (octamethyltetrahydrodicyclopentafluorenyl) zirconiumdichloride, di(p-n-butyl-phenyl)methylene (cyclopentadienyl)(dibenzofluorenyl)zirconium dichloride, di(p-n-butyl-phenyl)methylene(cyclopentadienyl)(1,1',3,6,8,8'-hexamethyl-2,7-dihydrodicyclopentafluorenyl)zirconiumdichloride, di(p-n-butyl-phenyl)methylene(cyclopentadienyl)(1,3,3',6,6',8-hexamethyl-2,7-dihydrodicyclopentafluorenyl)zirconiumdichloride, di(p-n-butyl-phenyl)methylene(cyclopentadienyl)(2,7-diphenyl-3,6-di-tert-butylfluorenyl)zirconiumdichloride, di(p-n-butyl-phenyl)methylene(cyclopentadienyl)(2,7-dimethyl-3,6-di-tert-butylfluorenyl)zirconiumdichloride, di(p-n-butyl-phenyl)methylene(cyclopentadienyl)(2,7-(trimethylphenyl)-3,6-di-tert-butyl fluorenyl)zirconiumdichloride, di(p-n-butyl-phenyl)methylene(cyclopentadienyl)(2,7-(dimethylphenyl)-3,6-di-tert-butyl fluorenyl) zirconiumdichloride, di(p-n-butyl-phenyl)methylene (cyclopentadienyl)(2,3,6,7-tetra-tert-butylfluorenyl) zirconiumdichloride, di(p-biphenyl)methylene (cyclopentadienyl)(2,7-di-tert-butylfluorenyl) zirconiumdichloride, di(p-biphenyl)methylene (cyclopentadienyl)(3,6-di-tert-butylfluorenyl) zirconiumdichloride, di(p-biphenyl)methylene (cyclopentadienyl)(octamethyloctahydrodibenzofluorenyl) zirconiumdichloride, di(p-biphenyl)methylene (cyclopentadienyl) (octamethyltetrahydrodicyclopentafluorenyl) zirconiumdichloride, di(p-biphenyl)methylene (cyclopentadienyl)(dibenzofluorenyl)zirconiumdichloride, di(p-biphenyl)methylene(cyclopentadienyl)(1,1',3,6,8,8'-hexamethyl-2,7-dihydrodicyclopentafluorenyl)zirconium-dichloride, di(p-biphenyl)methylene(cyclopentadienyl)(1,3,3',6,6',8-hexamethyl-2,7-dihydrodicyclopentafluorenyl) zirconiumdichloride, di(p-5-biphenyl)methylene (cyclopentadienyl)(2,7-diphenyl-3,6-di-tert-butylfluorenyl) zirconiumdichloride, di(p-biphenyl)methylene (cyclopentadienyl)(2,7-dimethyl-3,6-di-tert-butylfluorenyl) zirconiumdichloride, di(p-biphenyl)methylene (cyclopentadienyl)(2,7-(trimethylphenyl)-3,6-di-tert-butylfluorenyl)zirconiumdichloride, di(p-biphenyl) methylene(cyclopentadienyl)(2,7-(dimethylphenyl)-3,6-di-tert-butylfluorenyl)zirconiumdichloride, di(p-biphenyl) methylene(cyclopentadienyl)(2,3,6,7-tetra-tert-butylfluorenyl)zirconiumdichloride, di(1-naphthyl) methylene(cyclopentadienyl)(2,7-di-tert-butylfluorenyl) zirconiumdichloride, di(1-naphthyl)methylene (cyclopentadienyl)(3,6-di-tert-butylfluorenyl) zirconiumdichloride, di(1-naphthyl)methylene (cyclopentadienyl)(octamethyloctahydrodibenzofluorenyl) zirconiumdichloride, di(1-naphthyl)methylene (cyclopentadienyl) (octamethyltetrahydrodicyclopentafluorenyl) zirconiumdichloride, di(1-naphthyl)methylene (cyclopentadienyl)(dibenzofluorenyl) zirconiumdichloride, di(1-naphthyl)methylene(cyclopentadienyl)(1,1',3,6,8,8'- hexamethyl-2,7-dihydrodicyclopentafluorenyl)zirconium-dichloride, di(1-naphthyl)methylene(cyclopentadienyl)(1,3,3',6,6',8-hexamethyl-2,7-dihydrodicyclopentafluorenyl) zirconiumdichloride, di(1-naphthyl)methylene (cyclopentadienyl)(2,7-diphenyl-3,6-di-tert-butylfluorenyl) zirconiumdichloride, di(1-naphthyl)methylene (cyclopentadienyl)(2,7-dimethyl-3,6-di-tert-butylfluorenyl) zirconiumdichloride, di(1-naphthyl)methylene (cyclopentadienyl)(2,7-(trimethylphenyl)-3,6-di-tert-butylfluorenyl)zirconiumdichloride, di(1-naphthyl) methylene(cyclopentadienyl)(2,7-(dimethylphenyl)-3,6-di-tert-butylfluorenyl)zirconiumdichloride, di(1-naphthyl) methylene(cyclopentadienyl)(2,3,6,7-tetra-tert-butylfluorenyl)zirconiumdichloride, di(2-naphthyl) methylene(cyclopentadienyl)(2,7-di-tert-butylfluorenyl) zirconiumdichloride, di(2-naphthyl)methylene (cyclopentadienyl)(3,6-di-tert-butylfluorenyl) zirconiumdichloride, di(2-naphthyl)methylene (cyclopentadienyl)(octamethyloctahydrodibenzofluorenyl) zirconiumdichloride, di(2-naphthyl)methylene (cyclopentadienyl) (octamethyltetrahydrodicyclopentafluorenyl) zirconiumdichloride, di(2-naphthyl)methylene (cyclopentadienyl)(dibenzofluorenyl)zirconiumdichloride, di(2-naphthyl)methylene(cyclopentadienyl)(1,1',3,6,8,8'-hexamethyl-2,7-dihydrodicyclopentafluorenyl)zirconium-dichloride, di(2-naphthyl)methylene(cyclopentadienyl)(1,3,3',6,6',8-hexamethyl-2,7-dihydrodicyclopentafluorenyl) zirconiumdichloride, di(2-naphthyl)methylene (cyclopentadienyl)(2,7-diphenyl-3,6-di-tert-butylfluorenyl) zirconiumdichloride, di(2-naphthyl)methylene (cyclopentadienyl)(2,7-dimethyl-3,6-di-tert-butylfluorenyl) zirconiumdichloride, di(2-naphthyl)methylene (cyclopentadienyl)(2,7-(trimethylphenyl)-3,6-di-tert-butylfluorenyl)zirconiumdichloride, di(2-naphthyl) methylene(cyclopentadienyl)(2,7-(dimethylphenyl)-3,6-di-tert-butylfluorenyl)zirconiumdichloride, di(2-naphthyl) methylene(cyclopentadienyl)(2,3,6,7-tetra-tert-butylfluorenyl)zirconiumdichloride, di(naphthylmethyl) methylene(cyclopentadienyl)(2,7-di-tert-butylfluorenyl) zirconiumdichloride, di(naphthylmethyl)methylene (cyclopentadienyl)(3,6-di-tert-butylfluorenyl) zirconiumdichloride, di(naphthylmethyl)methylene (cyclopentadienyl)(octamethyloctahydrodibenzofluorenyl) zirconiumdichloride, di(naphthylmethyl)methylene (cyclopentadienyl)(benzofluorenyl)zirconiumdichloride, di(naphthylmethyl)methylene(cyclopentadienyl)(dibenzofluorenyl)zirconiumdichloride, di(naphthylmethyl)methylene(cyclopentadienyl)(octahydrodibenzofluorenyl)zirconiumdichloride, di(naphthylmethyl)methylene (cyclopentadienyl) (octamethyltetrahydrodicyclopentafluorenyl) zirconiumdichloride, di(m-tolyl)methylene (cyclopentadienyl)(2,7-di-tert-butylfluorenyl) zirconiumdichloride, di(m-tolyl)methylene (cyclopentadienyl)(2,7-dimethylfluorenyl) zirconiumdichloride, di(m-tolyl)methylene (cyclopentadienyl)(3,6-di-tert-butylfluorenyl) zirconiumdichloride, di(p-isopropylphenyl)methylene (cyclopentadienyl)(octamethyloctahydrodibenzofluorenyl) zirconiumdichloride, di(p-isopropylphenyl)methylene (cyclopentadienyl)(octamethyloctahydrodibenzofluorenyl) zirconiumdichloride, di(p-isopropylphenyl)methylene (cyclopentadienyl)(2,7-di-tert-butylfluorenyl) zirconiumdichloride, di(p-isopropylphenyl)methylene (cyclopentadienyl)(3,6-di-tert-butylfluorenyl) zirconiumdichloride, diphenethylmethylene (cyclopentadienyl)(2,7-di-tert-butylfluorenyl) zirconiumdichloride, diphenethylmethylene (cyclopentadienyl)(3,6-di-tert-butylfluorenyl) zirconiumdichloride, diphenethylmethylene (cyclopentadienyl)(octamethyloctahydrodibenzofluorenyl) zirconiumdichloride, diphenethylmethylene (cyclopentadienyl)(benzofluorenyl)zirconiumdichloride, diphenethylmethylene(cyclopentadienyl)(dibenzofluorenyl) zirconiumdichloride, diphenethylmethylene(cyclopentadienyl)(octahydrodibenzofluorenyl)zirconiumdichloride, diphenethylmethylene(cyclopentadienyl)(octamethyltetrahydrodicyclopentafluorenyl)zirconiumdichloride, di(benzhydryl)methylene(cyclopentadienyl)(2,7-di-tert-butylfluorenyl)zirconiumdichloride, di(benzhydryl)methylene (cyclopentadienyl)(3,6-di-tert-butylfluorenyl) zirconiumdichloride, di(benzhydryl)methylene (cyclopentadienyl)(octamethyloctahydrodibenzofluorenyl) zirconiumdichloride, di(benzhydryl)methylene (cyclopentadienyl)(benzofluorenyl)zirconiumdichloride, di(benzhydryl)methylene(cyclopentadienyl)(dibenzofluorenyl)zirconiumdichloride, di(benzhydryl)methylene(cyclopentadienyl)(octahydrodibenzofluorenyl)zirconiumdichloride, di(benzhydryl)methylene(cyclopentadienyl) (octamethyltetrahydrodicyclopentafluorenyl) zirconiumdichloride, di(cumyl)methylene (cyclopentadienyl)(fluorenyl)zirconiumdichloride, di(cumyl)methylene(cyclopentadienyl)(2,7-di-tert-butylfluorenyl)zirconiumdichloride, di(cumyl)methylene(cyclopentadienyl)(3,6-di-tert-butylfluorenyl)zirconiumdichloride, di(cumyl)methylene(cyclopentadienyl) (octamethyloctahydrodibenzofluorenyl) zirconiumdichloride, di(cumyl)methylene (cyclopentadienyl)(benzofluorenyl)zirconiumdichloride, di(cumyl)methylene(cyclopentadienyl)(dibenzofluorenyl) zirconiumdichloride, di(cumyl)methylene(cyclopentadienyl)(octahydrodibenzofluorenyl)zirconiumdichloride, di(cumyl)methylene(cyclopentadienyl)(octamethyltetrahydrodicyclopentafluorenyl)zirconiumdichloride, di(1-phenyl-ethyl)methylene(cyclopentadienyl)(2,7-di-tert-butylfluorenyl)zirconiumdichloride, di(1-phenyl-ethyl)methylene (cyclopentadienyl)(3,6-di-tert-butylfluorenyl) zirconiumdichloride, di(1-phenyl-ethyl)methylene (cyclopentadienyl)(octamethyloctahydrodibenzofluorenyl) zirconiumdichloride, di(1-phenyl-ethyl)methylene (cyclopentadienyl)(benzofluorenyl)zirconiumdichloride, di(1-phenyl-ethyl)methylene(cyclopentadienyl)(dibenzofluorenyl)zirconiumdichloride, di(1-phenyl-ethyl)methylene (cyclopentadienyl)(octahydrodibenzofluorenyl)zirconium-dichloride, di(1-phenyl-ethyl)methylene(cyclopentadienyl) (octamethyltetrahydrodicyclopentafluorenyl) zirconiumdichloride, di(biphenylmethyl)methylene (cyclopentadienyl)(fluorenyl)zirconiumdichloride, di(biphenylmethyl)methylene(cyclopentadienyl)(2,7-di-tert-butylfluorenyl)zirconiumdichloride, di(biphenylmethyl) methylene(cyclopentadienyl)(3,6-di-tert-butylfluorenyl)zirconiumdichloride, di(biphenylmethyl)methylene (cyclopentadienyl)(octamethyloctahydrodibenzofluorenyl) zirconiumdichloride, di(biphenylmethyl)methylene (cyclopentadienyl)(benzofluorenyl)zirconiumdichloride, di(biphenylmethyl)methylene(cyclopentadienyl)(dibenzofluorenyl)zirconiumdichloride, di(biphenylmethyl)methylene(cyclopentadienyl)(octahydrodibenzofluorenyl)zirconiumdichloride, di(biphenylmethyl)methylene (cyclopentadienyl) (octamethyltetrahydrodicyclopentafluorenyl) zirconiumdichloride, di(p-tolyl)methylene (cyclopentadienyl)(2,3,6,7-tetramethylfluorenyl)

zirconiumdichloride, diphenylsilylene(cyclopentadienyl)(2,7-di-tert-butylfluorenyl)zirconiumdichloride, diphenylsilylene(cyclopentadienyl)(3,6-di-tert-butylfluorenyl)zirconiumdichloride, diphenylsilylene(cyclopentadienyl)(octamethyloctahydrodibenzofluorenyl) zirconiumdichloride, diphenylsilylene(cyclopentadienyl)(octamethyltetrahydrodicyclopentafluorenyl) zirconiumdichloride, diphenylsilylene(cyclopentadienyl)(dibenzofluorenyl)zirconiumdichloride, diphenylsilylene(cyclopentadienyl)(1,1',3,6,8,8'-hexamethyl-2,7-dihydrodicyclopentafluorenyl)zirconiumdichloride, diphenylsilylene(cyclopentadienyl)(1,3,3',6,6',8-hexamethyl-2,7-dihydrodicyclopentafluorenyl)zirconiumdichloride, diphenylsilylene(cyclopentadienyl)(2,7-diphenyl-3,6-di-tert-butylfluorenyl)zirconiumdichloride, diphenylsilylene(cyclopentadienyl)(2,7-dimethyl-3,6-di-tert-butylfluorenyl) zirconiumdichloride, diphenylsilylene(cyclopentadienyl)(2,7-(trimethylphenyl)-3,6-di-tert-butylfluorenyl) zirconiumdichloride, diphenylsilylene(cyclopentadienyl)(2,7-(dimethylphenyl)-3,6-di-tert-butylfluorenyl) zirconiumdichloride, diphenylsilylene(cyclopentadienyl)(2,3,6,7-tetra-tert-butylfluorenyl)zirconiumdichloride, and the like. Further, in the compounds mentioned above, compounds in which "zirconium" is replaced with "hafnium" or "titanium", metallocene compounds in which "dichloride" is replaced with "difluoride", "dibromide", "diiodide", "dimethyl", or "methylethyl", and furthermore compounds in which "cyclopentadienyl" is replaced with "(3-tert-butyl-5-methyl-cyclopentadienyl)", "(3,5-dimethyl-cyclopentadienyl)", "(3-tert-butyl-cyclopentadienyl)", "(3-methyl-cyclopentadienyl)", and the like are also included as the metallocene compounds in the method of olefin polymerization of the present invention.

The bridged metallocene compounds (A) of the present invention can be produced by a method known in the art, and the method of production is not specifically limited. As examples of known methods, Official Gazette WO01/27174 and Official Gazette WO04/029062 by the present applicant can be cited.

[2] Olefin Polymerization Catalyst

Next, a preferred mode for using the bridged metallocene compounds (A) mentioned above as a polymerization catalyst in the method of olefin polymerization of the present invention will be explained.

When the bridged metallocene compounds of the present invention are to be used as an olefin polymerization catalyst, the catalyst components are composed of the bridged metallocene compound (A) represented by the general formula [I] mentioned above, and at least one kind of the compounds (B) selected from (b-1) an organoaluminum oxy-compound, (b-2) a compound capable of forming an ion pair in a reaction with the bridged metallocene compound (A) mentioned above, and (b-3) an organoaluminum compound. From the viewpoint of polymerization activity and properties of a produced olefin polymer, the components of (B) among the following [c1] to [c4] are used preferably:

[c1] (b-1) the organoaluminum oxy-compound only,

[c2] (b-1) the organoaluminum oxy-compound and (b-3) the organoaluminum compound,

[c3] (b-2) the compound capable of forming an ion pair in a reaction with the bridged metallocene compound (A) mentioned above and (b-3) an organoaluminum compound, and

[c4] (b-1) the organoaluminum oxy-compound and (b-2) the compound capable of forming an ion pair in a reaction with the bridged metallocene compound (A) mentioned above.

However, as described above, when a metallocene compound in which Y is silicon atom in the general formula [I] is used, as the component (B) which is a component composing the olefin polymerization catalyst of the present invention, (b-2) the compound capable of forming an ion pair in a reaction with the bridged metallocene compound (A) mentioned above is not used, and hence among the preferable (B) components, that is, [c1] to [c4], only those belonging to [c1] and [c2] are used.

In the following, each component will be specifically explained.

(b-1) Organoaluminum Oxy-compound

As (b-1) the organoaluminum oxy-compound used in the present invention, aluminoxane known in the art can be used as it is. Specifically, compounds represented by general formula [VII]

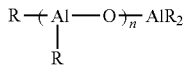

[VII]

and/or general formula [VIII]

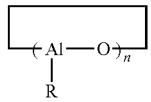

[VIII]

described below can be cited. (Here, R is hydrocarbon group having 1 to 10 carbon atoms, and n is an integer of 2 or more.) Methylaluminoxane with methyl group as R having n equal to 3 or more, preferably 10 or more is used in particular. (The organoaluminum oxy-compound with methyl group as R in general formula [VII] or [VIII] may also be referred to as "methylaluminoxane" in the following.)

Methylaluminoxane is an organoaluminum oxy-compound that has been used widely in the polyolefin industry sector due to easy availabilities and high polymerization activity. However, because it is difficult to be dissolved in a saturated hydrocarbon, it had to be used as a solution of aromatic hydrocarbons such as toluene, benzene and the like that cause large environmental impact. Under these circumstances, compounds analogous to methylaluminoxane have been developed. As an example of such analogous compounds, modified methylaluminoxane represented by general formula [IX] described below can be cited. The organoaluminum oxy-compound (b-1) in the method of high temperature polymerization of the present invention includes also such modified methylaluminoxane.

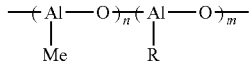

[IX]

(Here, R is hydrocarbon group having 2 to 20 carbon atoms; and m and n are integers of 2 or more.)

The modified methylaluminoxane represented by general formula [IX] mentioned above can be prepared by using trimethylaluminum and alkylaluminum except trimethylaluminum (of which manufacturing methods are disclosed for example in U.S. Pat. No. 4,960,878, U.S. Pat. No. 5,041,584, etc.). Modified methylaluminoxane products in which R is isobutyl group prepared by using trimethylaluminum and isobutylaluminum are commercially available with trade names such as MMAO, TMAO from manufacturers such as Tosoh Finechem Corporation (for example, Tosoh Research & Technology Review, Vol. 47, 55 (2003)). However, even if polymerization is carried out by using MMAO and TMAO in the form of a solution of a saturated hydrocarbon outside of the technical range of the method of high temperature solution polymerization of the present invention, the present applicant has confirmed that it is impossible to achieve the activity exceeding that of methylaluminoxane. According to the method of high temperature solution polymerization of the present invention, even when a solution of a saturated hydrocarbon containing the modified aluminoxane represented by general formula [IX] mentioned above, high polymerization activity is expressed. This point is also one of the characteristics of the method of high temperature solution polymerization of the present invention.

In addition, in the method of high temperature solution polymerization of the present invention, organoaluminum oxy-compounds that are insoluble in benzene exemplified in Japanese Patent Publication No. H02-78687 can also be employed.

Moreover, as the organoaluminum oxy-compounds used in the present invention, organoaluminum oxy-compounds containing boron represented by general formula [X] mentioned below can be cited.

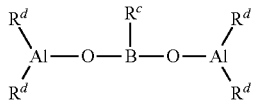

[X]

(Here, $R^c$ represents hydrocarbon group having 1 to 10 carbon atoms. $R^d$ may be each identical or different, and represents hydrogen atom, halogen atom, or hydrocarbon group having 1 to carbon atoms.)

In the organoaluminum oxy-compounds described above (b-1), the presence of a few organoaluminum compounds is not problematic.

(b-2) Compounds that Form an Ion Pair in a Reaction with the Bridged Metallocene Compound (A)

As the compounds that form an ion pair in a reaction with the bridged metallocene compound (A) (b-2) (hereinafter which may be referred to as "ionic compound"), Lewis acids, ionic compounds, borane compounds, etc. that are described in, for example, Japanese Patent Publication No. H-01-501950, Japanese Patent Publication No. H-01-502036, Japanese Patent Publication No. H-03-179005, Japanese Patent Publication No. H-03-179006, Japanese Patent Publication No. H-03-207703, Japanese Patent Publication No. H-03-207704, U.S. Pat. No. 5,321,106, etc. can be cited. Further, heteropoly-compounds and isopoly-compounds can also be cited.

The ionic compounds that are employed preferably in the present invention are the compounds represented by general formula [XI] mentioned below.

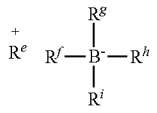

[XI]

In the formula, examples of $R^{e+}$ include $H^+$, carbenium cation, oxonium cation, ammonium cation, phosphonium cation, cycloheptyltrienyl cation, ferrocenium cation containing transition metal element, and the like. Groups $R^f$ to $R^i$ may be each identical or different, and refer to organic group, preferably aryl group. Specific examples of the carbenium cation mentioned above include triply substituted carbenium cations such as triphenylcarbenium cation, tris(methylphenyl)carbenium cation, tris(dimethylphenyl)carbenium cation, and the like.

Specific examples of the ammonium cations mentioned above include trialkylammonium cations such as trimethylammonium cation, triethylammonium cation, tri(n-propyl)ammonium cation, triisopropylammonium cation, tri(n-butyl)ammonium cation, triisobutylammonium cation, and the like; N,N-dialkylanilinium cations such as N,N-dimethylanilinium cation, N,N-diethylanilinium cation, N,N-2,4,6-pentamethylanilinium cation, and the like; and dialkylammonium cations such as diisopropylammonium cation, dicyclohexylammonium cation, and the like. Specific examples of the phosphonium cations mentioned above include triarylphosphonium cations etc. such as triphenylphosphonium cation, tris(methylphenyl)phosphonium cation, tris(dimethylphenyl)phosphonium cation, and the like.

Among those mentioned above, carbenium cation, ammonium cation, and the like are preferable as $R^{e+}$; and triphenylcarbenium cation, N,N-dimethylanilinium cation, and N,N-diethylanilinium cation are particularly preferable as $R^{e+}$.

Specific examples of carbenium salts include triphenylcarbeniumtetraphenylborate, triphenylcarbeniumtetrakis(pentafluorophenyl)borate, triphenylcarbeniumtetrakis(3,5-ditrifluoromethylphenyl)borate, tris(4-methylphenyl)carbeniumtetrakis(pentafluorophenyl)borate, tris(3,5-dimethylphenyl)carbeniumtetrakis(pentafluorophenyl)borate, and the like.

As the ammonium salts, trialkyl-substituted ammonium salt, N,N-dialkylanilinium salt, dialkylammonium, and the like are cited.

Specific examples of trialkyl-substituted ammonium salts include triethylammoniumtetraphenylborate, tripropylammoniumtetraphenylborate, tri(n-butyl)ammoniumtetraphenylborate, trimethylammoniumtetrakis(p-tolyl)borate, trimethylammoniumtetrakis(o-tolyl)borate, tri(n-butyl)ammoniumtetrakis(pentafluorophenyl)borate, triethylammoniumtetrakis(pentafluorophenyl)borate, tripropylammoniumtetrakis(pentafluorophenyl)borate, tripropylammoniumtetrakis(2,4-dimethylphenyl)borate, tri(n-butyl)ammoniumtetrakis(3,5-dimethylphenyl)borate, tri(n-butyl)ammoniumtetrakis(4-trifluoromethylphenyl)borate, tri(n-butyl)ammoniumtetrakis(3,5-ditrifluoromethylphenyl)borate, tri(n-butyl)ammoniumtetrakis(o-tolyl)borate, dioctadecylmethylammoniumtetraphenylborate, dioctadecylmethylammoniumtetrakis(p-tolyl)borate, dioctadecylmethylammoniumtetrakis(o-tolyl)borate, dioctadecylmethylammoniumtetrakis(pentafluorophenyl)borate, dioctadecylmethylammoniumtetrakis(2,4-dimethylphenyl)borate, dioctadecylmethylammoniumtetrakis(3,5-dimethylphenyl)borate, dioctadecylmethylammoniumtetrakis(4-trifluoromethylphenyl)borate, dioctadecylmethylammoniumtetrakis(3,5-ditrifluoromethylphenyl)borate, dioctadecylmethylammonium, and the like.

Specific examples of N,N-dialkylanilinium salts include N,N-dimethylaniliniumtetraphenylborate, N,N-dimethylaniliniumtetrakis(pentafluorophenyl)borate, N,N-dimethylaniliniumtetrakis(3,5-ditrifluoromethylphenyl)borate, N,N-diethylaniliniumtetraphenylborate, N,N-diethylaniliniumtetrakis(pentafluorophenyl)borate, N,N-diethylaniliniumtetrakis(3,5-ditrifluoromethylphenyl)

borate, N,N-2,4,6-pentamethylaniliniumtetraphenylborate, N,N-2,4,6-pentamethylaniliniumtetrakis(pentafluorophenyl)borate, and the like.

Specific examples of dialkylammonium salts include di(1-propyl)ammoniumtetrakis(pentafluorophenyl)borate, dicyclohexylammoniumtetraphenylborate, and the like.

Additionally, ionic compounds that have been disclosed by the present applicant (Japanese Patent Publication No. 2004-51676) can also be used without limitation.

The ionic compounds (b-2) mentioned above can be used in a combination of 2 or more kinds.

(b-3) Organoaluminum Compounds

As the organoaluminum compounds (b-3) that compose the olefin polymerization catalyst, for example, organoaluminum compounds represented by general formula [XII] mentioned below, alkyl complex compounds containing Group 1 metal element and aluminum represented by general formula [XIII], and the like are cited.

$$R^a_m Al(OR^b)_n H_p X_q \quad [XII]$$

(In the formula, $R^a$ and $R^b$ may be each identical or different, and refer to hydrocarbon group having 1 to 15 carbon atoms, preferably having 1 to 4 carbon atoms. X refers to halogen atom; m, n, p, and q are integers where m is in the range of $0<m\leqq 3$, n is in the range of $0\leqq n<3$, p is in the range of $0\leqq p<3$, and q is in the range of $0\leqq q<3$, and satisfy the condition: $m+n+p+q=3$.) The compounds represented by general formula [XII] refer to organoaluminum compounds. Specific examples of such compounds include tri(n-alkyl) aluminum such as trimethylaluminum, triethylaluminum, tri(n-butyl)aluminum, trihexylaluminum, trioctylaluminum, and the like; tri(branched chain-alkyl)aluminum such as triisopropylaluminum, triisobutylaluminum, tri(sec-butyl)aluminum, tri(tert-butyl)aluminum, tri(2-methylbutyl)aluminum, tri(3-methylexyl)aluminum, tri(2-ethylexyl)aluminum, and the like; tricycloalkylaluminum such as tricyclohexylaluminum, tricyclooctylaluminum, and the like; triarylaluminum such as triphenylaluminum, tritolylaluminum, and the like; dialkylaluminumhalide such as diisopropylaluminumhalide, diisobutylaluminumhalide, and the like; alkenylaluminum such as isoprenylaluminum etc. represented by general formula $(i\text{-}C_4H_9)_x Al_y (C_5H_{10})_z$ (wherein x, y, and z are positive integers, and z is in the range of $z\leqq 2x$); alkylaluminumalkoxide such as isobutylaluminummethoxide, isobutylaluminumethoxide, and the like; dialkylaluminumalkoxide such as dimethylaluminummethoxide, diethylaluminumethoxide, dibutylaluminumbutoxide, and the like; alkylaluminumsesquialkoxide such as ethylaluminumsesquiethoxide, butylaluminumsesquibutoxide, and the like; partially alkoxylated alkylaluminum having mean compositions represented by general formula $R^a_{2.5}Al(OR^b)_{0.5}$ and the like; alkylaluminumaryloxide such as diethylaluminumphenoxide, diethylaluminum(2,6-di-t-butyl-4-methylphenoxide), and the like; dialkylaluminumhalide such as dimethylaluminumchloride, diethylaluminumchloride, dibutylaluminumchloride, diethylaluminumbromide, diisobutylaluminumchloride, and the like; alkylaluminumsesquihalide such as ethylaluminumsesquichloride, butylaluminumsesquichloride, ethylaluminumsesquibromide, and the like; partially halogenated alkylaluminum such as alkylaluminumdihalide such as ethylaluminumdichloride, and the like; dialkylaluminumhydride such as diethylaluminumhydride, dibutylaluminumhydride, and the like; partially hydrogenated alkylaluminum such as alkylaluminumdihydride such as ethylaluminumdihydride, propylaluminumdihydride, and the like; partially alkoxylated and halogenated alkylaluminum, and the like such as ethylaluminumethoxychloride, butylaluminumbutoxychloride, ethylaluminumethoxybromide, and the like.

$$M^2AlR^a_4 \quad [XIII]$$

(In the formula, N represents Li, Na, or K, and $R^a$ represents hydrocarbon group having 1 to 15 carbon atoms, preferably 1 to 4.) The compounds represented by general formula [XIII] refer to complex alkyl compounds containing Group 1 metal element of the periodic table and aluminum. Such compounds are exemplified by $LiAl(C_2H_5)_4$, $LiAl(C_7H_{15})_4$, and the like.

Further, compounds analogous to those represented by general formula [XII] mentioned above can also be used, and, for example, organoaluminum compounds in which 2 or more aluminum compounds are bonded via nitrogen atom can be cited. Specific examples of such compounds include $(C_2H_5)_2AlN(C_2H_5)Al(C_2H_5)_2$, and the like.

From the point of easy availabilities, as the organoaluminum compound (b-3), trimethylaluminum and triisobutylaluminum are used preferably.

In the polymerization, methods of use of each component and the order of addition are chosen arbitrarily, but the following methods are exemplified.

[q1] Method of charging component (A) singly to a polymerization reactor.

[q2] Method of charging component (A) and component (B) in an arbitrary order to the polymerization reactor.

In the method [q2] mentioned above, at least 2 of the catalyst components may be in contact with each other in advance.

When olefin polymerization is carried out by using the catalyst for olefin polymerization mentioned above, component (A) is usually used in the amount of $10^{-9}$ to $10^{-1}$ mole, preferably $10^{-8}$ to $10^{-2}$ mole with respect to the reaction volume of 1 liter.

Component (b-1) is used in the amount at which the molar ratio of component (b-1) to the total transition metal (M) in component (A), that is, [(b-1)/M], is usually in the range between 0.01 and 5,000, preferably between 0.05 and 2,000. Component (b-2) is used in the amount at which the molar ratio of aluminum atoms in component (b-2) to the total transition metal (M) in component (A), that is, [(b-2)/M], is usually in the range between 10 and 5,000, preferably in the range between 20 and 2,000. Component (b-3) is used in the amount at which the molar ratio of component (b-3) to the transition metal (M) in component (A), that is, [(b-3)/M], is usually in the range between 1 and 10,000, preferably in the range between 1 and 5,000.

[3] The Method of High Temperature Solution Polymerization and Olefin Polymers Obtained by the Method In the following, olefins applicable to the high temperature solution polymerization of the present invention, preferred mode of the method of high temperature solution polymerization, and characteristic properties of the olefin polymers obtained in the method of high temperature solution polymerization of the present invention will be successively explained.

Olefins Applicable to the High Temperature Solution Polymerization of the Present Invention In the present invention, the olefins applicable to the high temperature solution polymerization are one or more kinds of monomers selected from ethylene and α-olefins. In the high temperature solution polymerization of the present invention, by carrying out (co)polymerization using ethylene as the essential olefin and at least one kind of olefins selected from α-olefins having 3 to 20 carbon atoms as the optional olefin(s), it is possible to produce efficiently an ethylenic polymer which has a high comonomer content, a narrow composition distribution, and a narrow molecular weight distribution. When copolymerization is carried out by using ethylene and at least one kind of the olefins selected from α-olefins having 3 to 20 carbon atoms, the charge mole ratio of ethylene and the α-olefin having 3 to 20 carbon atoms is in the range of ethylene:α-olefin=10:90 to 99.9:0.1, preferably in the range of ethylene:α-olefin=30:70 to 99.9:0.1, and further more preferably in the range of ethylene:α-olefin=50:50 to 99.9:0.1.

Examples of the α-olefins having 3 to 20 carbon atoms include straight-chain or branched chain α-olefins having 3 to 20 carbon atoms, and the following are cited for example: propylene, 1-butene, 2-butenes, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicosene, and the like. The α-olefins applicable in the high temperature solution polymerization of the present invention also include olefins containing polar groups. Specific examples of the olefins containing polar groups include α,β-unsaturated carboxylic acids such as acrylic acid, methacrylic acid, fumaric acid, maleic anhydride, and the like, and metal salts thereof such as sodium salts etc.; α,β-unsaturated carboxylic acid esters such as methyl acrylate, ethyl acrylate, n-propyl acrylate, methyl methacrylate, ethyl methacrylate, and the like; vinyl esters such as vinyl acetate, vinyl propionate, and the like; unsaturated glycidyl esters such as glycidyl acrylate, glycidyl methacrylate, and the like. Further, it is also possible to carry out the high temperature solution polymerization by co-presence, in the reaction system, of the following compounds: vinylcyclohexane, dienes or polyenes; aromatic vinyl compounds such as styrenes like styrene, o-methylstyrene, m-methylstyrene, p-methylstyrene, o,p-dimethylstyrene, methoxystyrene, vinylvenzoic acid, methyl vinylbenzoate, vinylbenzyl acetate, hydroxystyrene, p-chlorostyrene, divinylbenzene, and the like; and 3-phenylpropylene, 4-phenylpropylene, α-methylstyrene, and the like. Among the α-olefins described above, propylene, 1-butene, 1-hexene, 4-methyl-1-pentene, and 1-octene are used preferably. Also, in the high temperature solution polymerization of the present invention, cyclic olefins having 3 to 30 carbon atoms, preferably 3 to 20 carbon atoms, such as cyclopentene, cycloheptene, norbornene, 5-methyl-2-norbornene, and tetracyclodecene may also be co-present.

Preferred Mode of the Method of High Temperature Solution Polymerization

The "the solution polymerization" of the present invention refers to a general name of the method of carrying out polymerization under the conditions in which a polymer is dissolved in an inert hydrocarbon solvent described below at the temperature higher than the melting point of the polymer. The polymerization temperature in the solution polymerization of the present invention is usually in the range between 120- and 300° C., preferably between 130 and 250° C., and more preferably between 130 and 200° C. (As described above, this solution polymerization is called "the high temperature solution polymerization" throughout the present specification.) In the high temperature solution polymerization of the present invention, when the polymerization temperature is below 120° C., the polymerization activity decreases extremely and hence it is not practical from the point of productivity. Also, in the region where the polymerization temperature is 120° C. or more, as the temperature increases, the viscosity of the solution during polymerization decreases and removing of polymerization heat becomes easy, and thus it is possible to achieve higher polymerization of the obtained olefin polymer. However, when the polymerization temperature exceeds 300° C., deterioration of the obtained polymer may occur and hence it is not preferable. Further, from the viewpoint of properties of the ethylenic polymer produced preferably in the high temperature solution polymerization of the present invention, in the polymerization temperature range between 120 and 200° C., the ethylenic polymer used favorably in many industrial sectors such as films, etc. can be efficiently produced as described below. Polymerization is performed under the polymerization pressure usually in the range between the normal pressure and 10 MPa gauge, and preferably between the normal pressure and 8 MPa gauge. The polymerization can be carried out by using any of batch, semi-continuous, and continuous methods. Also, the polymerization can be carried out by dividing the process into two or more steps that are different in the polymerization conditions. The molecular weight of the obtained olefin polymer can also be controlled by changing the hydrogen concentration in the polymerization system and the polymerization temperature, within the range of the present invention. Further, the molecular weight can be controlled by the amount of component (B) used. When hydrogen is added, the amount is usually in the range between 0.001 and 5,000 NL per 1 kg the produced olefin polymer.

Solvents used in the high temperature solution polymerization of the present invention are usually inert hydrocarbon solvents, and are preferably saturated hydrocarbons having boiling points in the range between 50 and 200° C. Specific examples include aliphatic hydrocarbons such as pentane, hexane, heptane, octane, decane, dodecane, kerosene, and the like; and alicyclic hydrocarbons such as cyclopentane, cyclohexane, methylcyclopentane, and the like. In addition, aromatic hydrocarbons such as benzene, toluene, xylenes, and the like, and halogenated hydrocarbons such as ethylene chloride, chlorobenzene, dichloromethane, and the like are also included as "the inert hydrocarbon solvents" of the high temperature solution polymerization of the present invention, and the use thereof is not limited.

As described above, in the high temperature solution polymerization of the present invention, not only organoaluminum oxy-compounds of the type soluble in aromatic hydrocarbons, that were frequently used, but also modified methylaluminoxanes soluble in aliphatic hydrocarbons and alicyclic hydrocarbons, such as MMAO, can be used. As a result, when aliphatic hydrocarbons and alicyclic hydrocarbons are employed as the solvent for the solution polymerization, it has become possible to completely eliminate the possibility that an aromatic hydrocarbon is mixed into the polymerization system or the produced olefin polymer. That is, the method of the high temperature solution polymerization of the present invention has also characteristics of reducing the environmental load and minimizing the health effect to humans.

The Olefin Polymer Obtained by the Method of High Temperature Solution Polymerization In the present invention, properties of the olefin polymer produced in the high temperature solution polymerization of the present invention are not specifically limited. However, the olefin polymer having extremely high industrial usefulness obtained by the high temperature solution polymerization of the present invention is an ethylenic polymer. In the following, preferable properties of the ethylenic polymer will be explained. The density of the ethylenic polymer obtained by the high temperature solution polymerization of the present invention is usually in the range between 0.85 and 0.95 g/cm$^3$, and preferably between 0.86 and 0.95 g/cm$^3$.

The melt flow rate $MFR_2$, (ASTM D-1238, 190° C., 2.16 kg load), of the ethylenic polymer obtained by the high temperature solution polymerization of the present invention is usually in the range between 0.01 and 200 g/10 min, and preferably between 0.05 and 100 g/10 min. Also, the value obtained by dividing $MFR_{10}$ (ASTM D-1238, 190° C., 10.0 kg load) by $MFR_2$, (=$MFR_{10}/MFR_2$) is usually in the range between 5.0 and 8.0, preferably between 5.5 and 7.8, and more preferably between 6.0 and 7.5.

The molecular weight distribution, (Mw/Mn, calculated as converted to polystyrene, where Mw: weight average molecular weight, and Mn: number average molecular weight) of the ethylenic polymer, obtained by the high temperature solution polymerization of the present invention, determined by GPC is in the range between 1.0 and 4.0, preferably between 1.2 and 3.0, and more preferably between 1.5 and 2.5.

The ethylene content of the ethylenic polymer obtained by the high temperature solution polymerization of the present invention is contained in the range between 100 and 50 mole %, preferably between 99.9 and 65 mole %, and more preferably between 99.7 and 70 mole %.

The ethylenic polymer satisfying the properties described above can also be produced by a method known in the art which uses a Ziegler-Natta catalyst, or by slurry polymerization and vapor-phase polymerization known in the art which use polymerization catalysts containing certain metallocene compounds. However, by employing the method of high temperature solution polymerization of the present invention, that is, by carrying out the olefin polymerization by using an inert hydrocarbon solvent in the presence of a polymerization catalyst containing the specific bridged metallocene compounds described above in the temperature range between 120 and 300° C., it is possible to achieve high polymerization activity efficiently, without using, for example, a large scale and expensive vapor-phase polymerization apparatus, further to maintain high molecular weight even when the comonomer content is large in the case of a copolymer, and furthermore to produce an olefin polymer having both a narrow molecular weight distribution and a narrow composition distribution that are properties unique to the polymer produced by using a metallocene-based polymerization catalyst. Therefore, the impact of the high temperature solution polymerization of the present invention on the development of the industry is extremely large.

In the following, methods of measurement of various properties used in the present invention will be explained.

[Density]

By using an oil-hydraulic hot press made by Shinto Metal Industries, Ltd. maintained at 190° C., first, a sheet with a thickness of 0.5 mm was formed at the pressure of 100 kg/cm$^2$ (9 pieces of 45×45×0.5 mm specimen taken out of a spacer in the form of 240×240×0.5 mm thickness). Then, using a separate oil-hydraulic hot press machine made by Shinto Metal Industries, Ltd. maintained at 20° C., measurement samples were prepared by pressing at the pressure of 100 kg/cm$^2$ while cooling. A SUS plate with a thickness of 5 mm was used as a hot plate.

The pressed sheet was processed at 120° C. for 1 hour, and after cooling it linearly to room temperature in 1 hour, measurement was performed by using a density gradient tube.

[Melt Flow Rate; $MFR_2$]

This is a value determined under the load of 2.16 kg at 190° C. according to a standard method of ASTM D-1238.

[Melt Flow Rate; $MFR_{10}$]

This is a value determined under the load of 10 kg at 190° C. according to a standard method of ASTM D-1238.

[Weight Average Molecular Weight (Mw) and Number Average Molecular Weight (Mn)]

Measurement was made by using GPC (gel permeation chromatography) by using o-dichlorobenzene as the solvent at 140° C.

In the following, the present invention will be further specifically explained by Examples. However, the present invention is by no means limited to these examples. Further, in Examples described below, in an experiment of the high temperature solution polymerization in which the organoaluminum oxy-compound (b-1) was sued as component (B), triisobutylaluminum as the organoaluminum compound (b-2) was added in order to completely remove impurities such as oxygen, moisture etc., and is not an essential component in the high temperature solution polymerization of the present invention as long as the absence of these impurities in the polymerization system can be confirmed.

EXAMPLE 1

In a stainless-steel autoclave of 2-liter volume fully flushed with nitrogen, 800 milliliter of hexane and 200 milliliter of 1-octene were charged into the autoclave. After increasing the temperature of the autoclave content to 145° C., the total pressure was set at 3 MPa-G by charging 500 milliliter of hydrogen and feeding ethylene. Next, 0.3 millimole of triisobutylaluminum, 0.001 millimole of di(p-tolyl)methylene (cyclopentadienyl)(octamethyloctahydrodibenzofluorenyl) zirconiumdichloride, and 0.01 millimole of N,N-dimethylaniliniumtetrakis(pentafluorophenyl)borate were pressed into the autoclave with nitrogen pressure, and polymerization was started by setting the rotation of a stirrer at 400 rpm. Thereafter, the total pressure was maintained at 3 MPa-G by continuously feeding ethylene only, and polymerization was performed at 150° C. for 30 minutes. After stopping the polymerization by adding a small amount of ethanol to the reaction system, unreacted ethylene was purged. The obtained polymer solution was poured into a large excess of methanol and a polymer was precipitated. After recovering the polymer by filtration, it was dried at 135° C. overnight under reduced pressure.

As a result, an ethylene-1-octene copolymer was obtained with a yield of 59.7 g. The obtained polymer had the density of 898 (kg/m$^3$), $MFR_2$=1.03 (g/10 min), $MFR_{10}$=7.62 (g/10 min), $MFR_{10}/MFR_2$=7.4, and Mw/Mn=2.12.

EXAMPLE 2

[Preparation of a Catalyst Solution]

In a glass flask flushed fully with nitrogen, 0.00025 millimole of di(p-tolyl)methylene(cyclopentadienyl)(octamethyloctahydrodibenzofluorenyl)zirconiumdichloride was charged, and a catalyst solution was prepared by adding a toluene solution containing MAO made by Albemarle Corporation in the amount of 0.0625 millimole equivalent of Al to the flask.

[Polymerization]

In a stainless-steel autoclave of 2-liter volume fully flushed with nitrogen, 800 milliliter of hexane and 200 milliliter of 1-octene were charged into the autoclave. After increasing the temperature of the autoclave content to 145° C., the total pressure was set at 3 MPa-G by charging 1,500 milliliter of hydrogen and feeding ethylene. Next, 1.0 millimole of triisobutylaluminum and the catalyst solution prepared as above were pressed into the autoclave by nitrogen pressure, and polymerization was started by setting the rotation of a stirrer at 400 rpm. Thereafter, polymerization was performed at 150° C. for 10 minutes by keeping the total pressure at 3 MPa-G by continuously feeding ethylene only. After stopping the polymerization by adding a small amount of ethanol to the reaction system, unreacted ethylene was purged. By pouring the obtained polymer solution into a large excess of methanol, a polymer was precipitated. After recovering the polymer by filtration, it was dried at 135° C. overnight under reduced pressure.

As a result, an ethylene-1-octene copolymer was obtained with a yield of 110.7 g. The obtained polymer had the density of 904 (kg/m$^3$), $MFR_2$=5.37 (g/10 min), $MFR_{10}$=36.0(g/10 min), $MFR_{10}/MFR_2$=6.7, and Mw/Mn=2.07.

EXAMPLE 3

[Preparation of a Catalyst Solution]

In a glass flask flushed fully with nitrogen, 0.001 millimole of di(p-tolyl)methylene(cyclopentadienyl)(octamethyloctahydrodibenzofluorenyl)zirconiumdichloride was charged, and a catalyst solution was prepared by adding a toluene solution containing MAO made by Albemarle Corporation in the amount of 0.25 millimole equivalent of Al to the flask.

[Polymerization]

In a stainless-steel autoclave of 2-liter volume fully flushed with nitrogen, 800 milliliter of hexane and 200 milliliter of 1-octene were charged into the autoclave. After increasing the temperature of the autoclave content to 175° C., the total pressure was set at 3 MPa-G by charging 1,000 milliliter of hydrogen and feeding ethylene. Next, 1.0 millimole of triisobutylaluminum and the catalyst solution prepared as above were pressed into the autoclave by nitrogen pressure, and polymerization was started by setting the rotation of a stirrer at 400 rpm. Thereafter, polymerization was performed at 180° C. for 30 minutes by keeping the total pressure at 3 MPa-G by continuously feeding ethylene only. After stopping the polymerization by adding a small amount of ethanol to the reaction system, unreacted ethylene was purged. By pouring the obtained polymer solution into a large excess of methanol, a polymer was precipitated. After recovering the polymer by filtration, it was dried at 135° C. overnight under reduced pressure.

As a result, an ethylene-1-octene copolymer was obtained with a yield of 88.6 g. The obtained polymer had the density of 904 (kg/m$^3$), $MFR_2$=6.52 (g/10 min), $MFR_{10}$=47.6 (g/10 min), $MFR_{10}/MFR_2$=7.3, and Mw/Mn=2.06.

EXAMPLE 4

[Preparation of a Catalyst Solution]

In a glass flask flushed fully with nitrogen, 0.0005 millimole of di(p-tolyl)methylene(cyclopentadienyl)(octamethyloctahydrodibenzofluorenyl)zirconiumdichloride was charged, and a catalyst solution was prepared by adding a hexane solution containing MMAO made by Tosoh Finechem Corporation in the amount of 0.125 millimole equivalent of Al to the flask.

[Polymerization]

By using the catalyst solution prepared as above, polymerization was performed in the manner similar to Example 2, except for changing the polymerization time to 30 minutes.

As a result, an ethylene-1-octene copolymer was obtained with a yield of 79.6 g. The obtained polymer had the density of 905 (kg/m$^3$), $MFR_2$=1.66 (g/10 min), $MFR_{10}$=10.8 (g/10 min), $MFR_{10}/MFR_2$=6.5, and Mw/Mn=2.15.

EXAMPLE 5

[Preparation of a Catalyst Solution]

In a glass flask flushed fully with nitrogen, 0.00025 millimole of di(p-tolyl)methylene(cyclopentadienyl)(octamethyloctahydrodibenzofluorenyl)zirconiumdichloride was charged, and a catalyst solution was prepared by adding a hexane solution containing TMAO-341 made by Tosoh Finechem Corporation in the amount of 0.0625 millimole equivalent of Al to the flask.

[Polymerization]

Polymerization was performed in the manner similar to Example 2 except for using the catalyst solution mentioned above.

As a result, an ethylene-1-octene copolymer was obtained with a yield of 80.3 g. The obtained polymer had the density of 904 (kg/m$^3$), $MFR_2$=4.31 (g/10 min), $MFR_{10}$=27.2 (g/10 min), $MFR_{10}/MFR_2$=6.3, and Mw/Mn=2.11.

EXAMPLE 6

Preparation of a catalyst solution and polymerization were performed in the manner similar to Example 3, except for changing the polymerization temperature to 200° C. and the amount of hydrogen charge to 700 milliliter.

As a result, an ethylene-1-octene copolymer was obtained with a yield of 35.0 g. The obtained polymer had the density of 905 (kg/m$^3$), and $MFR_2$=7.23 (g/10 min).

EXAMPLE 7

[Preparation of a Catalyst Solution]

In a glass flask flushed fully with nitrogen, 0.0005 millimole of di(p-tolyl)methylene(cyclopentadienyl)(octamethyloctahydrodibenzofluorenyl)zirconiumdichloride was charged, and a catalyst solution was prepared by adding a hexane solution containing MMAO made by Tosoh Finechem Corporation in the amount of 0.125 millimole equivalent of Al to the flask.

[Polymerization]

In a stainless-steel autoclave of 2-liter volume fully flushed with nitrogen, 600 milliliter of hexane and 400 milliliter of 1-octene were charged into the autoclave. After increasing the temperature of the autoclave content to 145° C., the total pressure was set at 3 MPa-G by charging 1,500 milliliter of hydrogen and feeding ethylene. Next, 0.1 millimole of triisobutylaluminum, and the catalyst solution prepared as above were pressed into the autoclave with nitrogen pressure, and polymerization was started by setting the rotation of a stirrer at 400 rpm. Thereafter, the total pressure was maintained at 3 MPa-G by continuously feeding ethylene only, and polymerization was performed at 150° C. for 8 minutes. After stopping the polymerization by adding a small amount of ethanol to the reaction system, unreacted ethylene was purged. The obtained polymer solution was poured into a large excess of methanol and a polymer was precipitated. After recovering the polymer by filtration, it was dried at 135° C. overnight under reduced pressure.

As a result, an ethylene-1-octene copolymer was obtained with a yield of 65.8 g. The obtained polymer had the density of 874 (kg/m$^3$), and $MFR_2$=2.80 (g/10 min)

EXAMPLE 8

Preparation of a catalyst solution and polymerization were performed in the manner similar to Example 7, except for changing the polymerization temperature to 140° C. and the polymerization time to 10 minutes.

As a result, an ethylene-1-octene copolymer was obtained with a yield of 85.0 g. The obtained polymer had the density of 865 (kg/m$^3$), and $MFR_2$=0.79 (g/10 min) [Example 9]

[Preparation of a Catalyst Solution]

In a glass flask flushed fully with nitrogen, 0.001 millimole of di(p-tolyl)methylene(cyclopentadienyl)(octamethyloctahydrodibenzofluorenyl)zirconiumdichloride was charged, and a catalyst solution was prepared by adding a hexane solution containing MMAO made by Tosoh Finechem Corporation in the amount of 0.25 millimole equivalent of Al to the flask.

[Polymerization]

By using the catalyst solution prepared as above and charging 950 milliliter of hexane and 50 milliliter of 1-octene, polymerization was performed in the manner similar to Example 7, except for changing the polymerization time to 10 minutes.

As a result, an ethylene-1-octene copolymer was obtained with a yield of 35.0 g. The obtained polymer had the density of 938 (kg/m$^3$) and $MFR_2$=3.23 (g/10 min)

EXAMPLE 10

By preparing a catalyst solution in the manner similar to Example 9, polymerization was performed in the manner similar to Example 9, except for charging 970 milliliter of hexane, 30 milliliter of 1-octene, and 2000 milliliter of hydrogen.

As a result, an ethylene-1-octene copolymer was obtained with a yield of 13.9 g. The obtained polymer had the density of 947 (kg/m$^3$) and $MFR_2$=13.9 (g/10 min)

EXAMPLE 11

Polymerization was performed in the manner similar to Example 1, except for replacing di(p-tolyl)methylene(cyclopentadienyl)(octamethyloctahydrodibenzofluorenyl)zirconiumdichloride with 0.002 millimole of di(1-naphthyl)methylene(cyclopentadienyl)(octamethyloctahydrodibenzofluorenyl)zirconiumdichloride, changing the amount of N,N-dimethylaniliniumtetrakis(pentafluorophenyl)borate to 0.02 millimole, and cutting off the charge of hydrogen.

As a result, an ethylene-1-octene copolymer was obtained with a yield of 59.8 g. The obtained polymer had the density of 895 (kg/m$^3$), $MFR_2$=1.04 (g/10 min), $MFR_{10}$=9.26 (g/10 min), $MFR_{10}/MFR_2$=8.9, and Mw/Mn=2.11.

EXAMPLE 12

In a glass flask flushed fully with nitrogen, 0.001 millimole of di(1-naphthyl)methylene(cyclopentadienyl)(octamethyloctahydrodibenzofluorenyl)zirconiumdichloride was charged. A catalyst solution was prepared by adding a toluene solution containing MAO made by Albemarle Corporation in the amount of 0.25 millimole equivalent of Al to the flask.

[Polymerization]

In a stainless-steel autoclave of 2-liter volume fully flushed with nitrogen, 800 milliliter of hexane and 200 milliliter of 1-octene were charged into the autoclave. After increasing the temperature of the autoclave content to 145° C., the total pressure was set at 3 MPa-G by feeding ethylene. Next, 1.0 millimole of triisobutylaluminum and the catalyst solution prepared as above were pressed into the autoclave by nitrogen pressure, and polymerization was started by setting the rotation of a stirrer at 400 rpm. Thereafter, polymerization was performed at 150° C. for 10 minutes by keeping the total pressure at 3 MPa-G by continuously feeding ethylene only. After stopping the polymerization by adding a small amount of ethanol to the reaction system, unreacted ethylene was purged. By pouring the obtained polymer solution into a large excess of methanol, a polymer was precipitated. After recovering the polymer by filtration, it was dried at 135° C. overnight under reduced pressure.

As a result, an ethylene-1-octene copolymer was obtained with a yield of 119.5 g. The obtained polymer had the density of 899 (kg/m$^3$) and $MFR_2$=0.42 (g/10 min)

EXAMPLE 13

[Preparation of a Catalyst Solution]

In a glass flask flushed fully with nitrogen, 0.0005 millimole of di(1-naphthyl)methylene(cyclopentadienyl)(octamethyloctahydrodibenzofluorenyl)zirconiumdichloride was charged. A catalyst solution was prepared by adding a toluene solution containing MAO made by Albemarle Corporation in the amount of 0.125 millimole equivalent of Al to the flask.

[Polymerization]

In a stainless-steel autoclave of 2-liter volume fully flushed with nitrogen, 800 milliliter of hexane and 200 milliliter of 1-octene were charged into the autoclave. After increasing the temperature of the autoclave content to 145° C., the total pressure was set at 3 MPa-G by charging 1,500 milliliter of hydrogen and feeding ethylene. Next, 1.0 millimole of triisobutylaluminum, and the catalyst solution prepared as above were pressed into the autoclave with nitrogen pressure, and polymerization was started by setting the rotation of a stirrer at 400 rpm. Thereafter, the total pressure was maintained at 3 MPa-G by continuously feeding ethylene only, and polymerization was performed at 150° C. for 30 minutes. After stopping the polymerization by adding a small amount of ethanol to the reaction system, unreacted ethylene was purged. The obtained polymer solution was poured into a large excess of methanol and a polymer was precipitated. After recovering the polymer by filtration, it was dried at 135° C. overnight under reduced pressure.

As a result, an ethylene-1-octene copolymer was obtained with a yield of 69.8 g. The obtained polymer had the density of 902 (kg/m$^3$), $MFR_2$=1.18 (g/10 min), $MFR_{10}$=7.55 (g/10 min), $MFR_{10}/MFR_2$=6.4, and Mw/Mn=2.19.

EXAMPLE 14

Preparation of a catalyst solution and polymerization were performed in the manner similar to Example 13, except for replacing di(1-naphthyl)methylene(cyclopentadienyl)(octamethyloctahydrodibenzofluorenyl)zirconiumdichloride with diphenylmethylene(cyclopentadienyl) (octamethyloctahydrodibenzofluorenyl)zirconiumdichloride and changing the amount of hydrogen charge to 1,000 milliliter.

As a result, an ethylene-1-octene copolymer was obtained with a yield of 50.6 g. The obtained polymer had the density of 904 (kg/m$^3$) and $MFR_2$=2.01 (g/10 min).

EXAMPLE 15

Preparation of a catalyst solution and polymerization were performed in the manner similar to Example 13, except for replacing di(1-naphthyl)methylene(cyclopentadienyl) (octamethyloctahydrodibenzofluorenyl)zirconiumdichloride with di(p-tert-butyl-phenyl)methylene(cyclopentadienyl)(octamethyloctahydrodibenzofluorenyl)zirconiumdichloride.

As a result, an ethylene-1-octene copolymer was obtained with a yield of 70.4 g. The obtained polymer had the density of 903 (kg/m$^3$), $MFR_2$=1.80 (g/10 min), $MFR_{10}$=12.60(g/10 min), $MFR_{10}/MFR_2$=7.0, and Mw/Mn=2.15.

EXAMPLE 16

Preparation of a catalyst solution and polymerization were performed in the manner similar to Example 13, except for replacing di(1-naphthyl)methylene(cyclopentadienyl) (octamethyloctahydrodibenzofluorenyl)zirconiumdichloride with di(m-trifluoromethyl-phenyl)methylene(cyclopentadienyl) (octamethyloctahydrodibenzofluorenyl)zirconiumdichloride.

As a result, an ethylene-1-octene copolymer was obtained with a yield of 75.9 g. The obtained polymer had the density of 902 (kg/m$^3$), $MFR_2$=1.09 (g/10 min), $MFR_{10}$=7.4 (g/10 min), $MFR_{10}/MFR_2$=6.8, and Mw/Mn=2.08.

EXAMPLE 17

Preparation of a catalyst solution and polymerization were performed in the manner similar to Example 13, except for replacing di(1-naphthyl)methylene(cyclopentadienyl) (octamethyloctahydrodibenzofluorenyl)zirconiumdichloride with di(p-chloro-phenyl)methylene(cyclopentadienyl)(octamethyloctahydrodibenzofluorenyl)zirconiumdichloride.

As a result, an ethylene-1-octene copolymer was obtained with a yield of 44.8 g. The obtained polymer had the density of 902 (kg/m$^3$) and $MFR_2$=4.90 (g/10 min).

EXAMPLE 18

Preparation of a catalyst solution and polymerization were performed in the manner similar to Example 13, except for replacing di(1-naphthyl)methylene(cyclopentadienyl) (octamethyloctahydrodibenzofluorenyl)zirconiumdichloride with di(p-biphenyl)methylene(cyclopentadienyl)(octamethyloctahydrodibenzofluorenyl)zirconiumdichloride.

As a result, an ethylene-1-octene copolymer was obtained with a yield of 48.4 g. The obtained polymer had the density of 904 (kg/m$^3$) and $MFR_2$=2.79 (g/10 min).

EXAMPLE 19

Preparation of a catalyst solution and polymerization were performed in the manner similar to Example 13, except for replacing di(1-naphthyl)methylene(cyclopentadienyl) (octamethyloctahydrodibenzofluorenyl)zirconiumdichloride with di(p-trifluoromethyl-phenyl)methylene(cyclopentadienyl)(octamethyloctahydrodibenzofluorenyl)zirconiumdichloride.

As a result, an ethylene-1-octene copolymer was obtained with a yield of 33.0 g. The obtained polymer had the density of 903 (kg/m$^3$) and $MFR_2$=1.82 (g/10 min)

EXAMPLE 20

Preparation of a catalyst solution and polymerization were performed in the manner similar to Example 13, except for replacing di(1-naphthyl)methylene(cyclopentadienyl) (octamethyloctahydrodibenzofluorenyl)zirconiumdichloride with di(p-tolyl)methylene(cyclopentadienyl)(2,7-dimethyl-3,6-di-tert-butylfluorenyl)zirconiumdichloride.

As a result, an ethylene-1-octene copolymer was obtained with a yield of 62.4 g. The obtained polymer had $MFR_2$=3.22 (g/10 min)

EXAMPLE 21

Preparation of a catalyst solution and polymerization were performed in the manner similar to Example 13, except for replacing di(1-naphthyl)methylene(cyclopentadienyl) (octamethyloctahydrodibenzofluorenyl)zirconiumdichloride with di(p-tolyl)methylene (cyclopentadienyl)(1,1',3,6,8,8'-hexamethyl-2,7-dihydrodicyclopentafluorenyl)zirconiumdichloride.

As a result, an ethylene-1-octene copolymer was obtained with a yield of 67.9 g. The obtained polymer had $MFR_2$=2.15 (g/10 min).

EXAMPLE 22

Preparation of a catalyst solution and polymerization were performed in the manner similar to Example 13, except for replacing di(1-naphthyl)methylene(cyclopentadienyl) (octamethyloctahydrodibenzofluorenyl)zirconiumdichloride with di(p-tolyl)methylene(cyclopentadienyl)(2,7-di-tert-butylfluorenyl)zirconiumdichloride, and changing the amount of hydrogen charge to 1,200 milliliter.

As a result, an ethylene-1-octene copolymer was obtained with a yield of 32.5 g. The obtained polymer had the density of 904 (kg/m$^3$) and $MFR_2$=1.21 (g/10 min)

EXAMPLE 23

In a glass flask flushed fully with nitrogen, 0.001 millimole of diphenylsilylene(cyclopentadienyl)(2,7-di-tert-butylfluorenyl)zirconiumdichloride was charged. A catalyst solution was prepared by adding a toluene solution containing MAO made by Albemarle Corporation in the amount of 0.25 millimole equivalent of Al to the flask.

[Polymerization]

In a stainless-steel autoclave of 2-liter volume fully flushed with nitrogen, 850 milliliter of hexane and 150 milliliter of 1-octene were charged into the autoclave. After increasing the temperature of the autoclave content to 135° C., the total pressure was set at 3 MPa-G by charging 200 milliliter of hydrogen and feeding ethylene. Next, 1.0 millimole of triisobutylaluminum, and the catalyst solution prepared as above were pressed into the autoclave with nitrogen pressure, and polymerization was started by setting the rotation of a stirrer at 400 rpm. Thereafter, the total pressure was maintained at 3 MPa-G by continuously feeding ethylene only, and polymerization was performed at 140° C. for 30 minutes. After stopping the polymerization by adding a small amount of ethanol to the reaction system, unreacted ethylene was purged. The obtained polymer solution was poured into a large excess of methanol and a polymer was precipitated. After recovering the polymer by filtration, it was dried at 135° C. overnight under reduced pressure. As a result, an ethylene-1-octene copolymer was obtained with a yield of 64.9 g. The obtained polymer had $MFR_2$=1.80 (g/10 min).

EXAMPLE 24

Preparation of a catalyst solution and polymerization were performed in the manner similar to Example 23, except for replacing diphenylsilylene(cyclopentadienyl) (2,7-di-tert-butylfluorenyl)zirconiumdichloride with diphenylsilylene (cyclopentadienyl) (octamethyloctahydrodibenzofluorenyl) zirconiumdichloride.

As a result, an ethylene-1-octene copolymer was obtained with a yield of 80.9 g. The obtained polymer had $MFR_2$=1.40 (g/10 min).

EXAMPLE 25

Preparation of a catalyst solution and polymerization were performed in the manner similar to Example 13, except for replacing di(1-naphthyl)methylene(cyclopentadienyl)(octamethyloctahydrodibenzofluorenyl)zirconiumdichloride with 0.001 millimole of di(p-tolyl)methylene(cyclopentadienyl)(2,7-diphenyl-3,6-di-tert-butylfluorenyl)zirconiumdichloride, and changing the toluene solution containing MAO made by Albemarle Corporation to contain 0.25 millimole equivalent of Al.

As a result, an ethylene-1-octene copolymer was obtained with a yield of 74.2 g. The obtained polymer had $MFR_2$=2.50 (g/10 min).

EXAMPLE 26

Preparation of a catalyst solution and polymerization were performed in the manner similar to Example 12, except for replacing di(1-naphthyl)methylene(cyclopentadienyl)(octamethyloctahydrodibenzofluorenyl)zirconiumdichloride with 0.002 millimole of di(m-trifluoromethyl-phenyl)methylene(3-methyl-5-tert-butylcyclopentadienyl) (2,7-di-tert-butylfluorenyl)zirconiumdichloride, changing the toluene solution containing MAO made by Albemarle Corporation to contain 0.5 millimole from 0.25 millimole equivalent of Al, and changing the polymerization time to 30 minutes.

As a result, an ethylene-1-octene copolymer was obtained with a yield of 75.9 g. The obtained polymer had the density of 905 (kg/$m^3$), $MFR_2$=9.10 (g/10 min), $MFR_{10}$=66.0 (g/10 min), $MFR_{10}/MFR_2$=7.2, and Mw/Mn=2.19.

EXAMPLE 27

Preparation of a catalyst solution and polymerization were performed in the manner similar to Example 12, except for replacing di(1-naphthyl)methylene(cyclopentadienyl)(octamethyloctahydrodibenzofluorenyl)zirconiumdichloride with diphenylmethylene(3-ethyl-5-tert-butylcyclopentadienyl)(2,7-di-tert-butylfluorenyl)zirconiumdichloride, and changing the polymerization time to 30 minutes.

As a result, an ethylene-1-octene copolymer was obtained with a yield of 30.9 g. The obtained polymer had $MFR_2$=3.29 (g/10 min).

EXAMPLE 28

In a stainless-steel autoclave of 2-liter volume fully flushed with nitrogen, 800 milliliter of hexane and 200 milliliter of 1-octene were charged into the autoclave. After increasing the temperature of the autoclave content to 145° C., the total pressure was set at 3 MPa-G by feeding ethylene. Next, 0.3 millimole of triisobutylaluminum, 0.004 millimole of diphenylmethylene(3-methyl-5-tert-butylcyclopentadienyl)(2,7-di-tert-butylfluorenyl)zirconiumdichloride, and 0.04 millimole of triphenylcarbeniumtetrakis(pentafluorophenyl) borate were pressed into the autoclave with nitrogen pressure, and polymerization was started by setting the rotation of a stirrer at 400 rpm. Thereafter, polymerization was performed at 150° C. for 30 minutes by keeping the total pressure at 3 MPa-G by continuously feeding ethylene only. After stopping the polymerization by adding a small amount of ethanol to the reaction system, unreacted ethylene was purged. By pouring the obtained polymer solution into a large excess of methanol, a polymer was precipitated. After recovering the polymer by filtration, it was dried at 135° C. overnight under reduced pressure.

As a result, an ethylene1-octene copolymer was obtained with a yield of 18.9 g. The obtained polymer had the density of 905 (kg/$m^3$), $MFR_2$=14.9 (g/10 min), $MFR_{10}$=100 (g/10 min), $MFR_{10}/MFR_2$=6.7, and Mw/Mn=2.08.

EXAMPLE 29

Preparation of a catalyst solution and polymerization were performed in the manner similar to Example 12, except for replacing di(1-naphthyl)methylene(cyclopentadienyl)(octamethyloctahydrodibenzofluorenyl)zirconiumdichloride with 0.002 millimole of diphenylmethylene(3-methyl-5-tert-butylcyclopentadienyl)(2,7-di-tert-butylfluorenyl)zirconiumdichloride, changing the toluene solution containing MAO made by Albemarle Corporation to contain 0.5 millimole from 0.25 millimole equivalent of Al, and changing the polymerization time to 30 minutes.

As a result, an ethylene-1-octene copolymer was obtained with a yield of 97.5 g. The obtained polymer had the density of 908 (kg/$m^3$), $MFR_2$=7.84 (g/10 min), $MFR_{10}$=56.5 (g/10 min), $MFR_{10}/MFR_2$=7.2, and Mw/Mn=2.15.

COMPARATIVE EXAMPLE 1

Preparation of a catalyst solution and polymerization were performed in the manner similar to Example 23, except for replacing diphenylsilylene(cyclopentadienyl)(2,7-di-tert-butylfluorenyl)zirconiumdichloride with 0.002 millimole of dimethylmethylene(cyclopentadienyl)(fluorenyl)zirconiumdichloride, changing the toluene solution containing MAO made by Albemarle Corporation to contain 0.4 millimole from 0.25 millimole equivalent of Al, and cutting off the charging of hydrogen during polymerization.

As a result, an ethylene-1-octene copolymer was obtained with a yield of 11.2 g. The obtained polymer had the density of 927 (kg/$m^3$) and $MFR_2$=19.3 (g/10 min).

COMPARATIVE EXAMPLE 2

Preparation of a catalyst solution and polymerization were performed in the manner similar to Comparative example 1, except for replacing dimethylmethylene(cyclopentadienyl)(fluorenyl)zirconiumdichloride with dimethylsilylene(cyclopentadienyl)(fluorenyl)zirconiumdichloride.

As a result, an ethylene-1-octene copolymer was obtained with a yield of 35.0 g. The obtained polymer had the density of 917 (kg/$m^3$) and $MFR_2$=0.26 (g/10 min).

COMPARATIVE EXAMPLE 3

Preparation of a catalyst solution and polymerization were performed in the manner similar to Comparative example 1, except for replacing dimethylmethylene(cyclopentadienyl)(fluorenyl)zirconiumdichloride with dimethylsilylene(indenyl)(fluorenyl)zirconiumdichloride.

As a result, an ethylene-1-octene copolymer was obtained with a yield of 17.7 g. The obtained polymer had the density of 920 (kg/$m^3$) and $MFR_2$=15.9 (g/10 min).

COMPARATIVE EXAMPLE 4

In a stainless-steel autoclave of 2-liter volume fully flushed with nitrogen, 950 milliliter of hexane and 50 milliliter of 1-octene were charged into the autoclave. After increasing the temperature of the autoclave content to 145° C., the total pressure was set at 3 MPa-G by feeding ethylene. Next, 0.3 millimole of triisobutylaluminum, 0.002-millimole of (tert-butylamide)(dimethyl)(tetramethyl-η5-cyclopentadienyl)silanedichlorotitanium, and 0.01 millimole of triphenylcarbeniumtetrakis(pentafluorophenyl)borate were pressed into the autoclave with nitrogen pressure, and polymerization was started by setting the rotation of a stirrer at 400 rpm. Thereafter, polymerization was performed at 150° C. for 30 minutes by keeping the total pressure at 3 MPa-G by continuously feeding ethylene only. After stopping the polymerization by adding a small amount of ethanol to the reaction system, unreacted ethylene was purged. By pouring the obtained polymer solution into a large excess of methanol, a polymer was precipitated. After recovering the polymer by filtration, it was dried at 135° C. overnight under reduced pressure.

As a result, an ethylene-1-octene copolymer was obtained with a yield of 27.9 g. The obtained polymer had the density of 899 (kg/m$^3$), $MFR_2$=1.24 (g/10 min), $MFR_{10}$=11.0 (g/10 min), $MFR_{10}/MFR_2$=8.9, and Mw/Mn=2.67.

TABLE 1

| | Component (A) | | Component (B) (b1) or (b2) | | Component (B) (b3) | $C_8^-$ | | |
|---|---|---|---|---|---|---|---|---|
| | Compounds note 2) | mmol | Compounds note 3) | mmol | note 1) mmol | note 4) mL | $H_2$ mL | Temp ° C. |
| Example 1 | a | 0.001 | A | 0.01 | 0.3 | 200 | 500 | 150 |
| Example 2 | | 0.00025 | B | 0.625 | 1 | 200 | 1500 | 150 |
| Example 3 | | 0.001 | B | 0.25 | 1 | 200 | 1000 | 180 |
| Example 4 | | 0.0005 | C | 0.125 | 1 | 200 | 1500 | 150 |
| Example 5 | | 0.00025 | D | 0.0625 | 1 | 200 | 1500 | 150 |
| Example 6 | | 0.001 | B | 0.25 | 1 | 200 | 700 | 200 |
| Example 7 | | 0.0005 | C | 0.125 | 1 | 400 | 1500 | 150 |
| Example 8 | | 0.0005 | C | 0.125 | 1 | 400 | 1500 | 140 |
| Example 9 | | 0.001 | C | 0.25 | 1 | 50 | 1000 | 150 |
| Example 10 | | 0.001 | C | 0.25 | 1 | 30 | 2000 | 150 |
| Example 11 | b | 0.002 | A | 0.02 | 0.3 | 200 | — | 150 |
| Example 12 | | 0.001 | B | 0.25 | 1 | 200 | — | 150 |
| Example 13 | | 0.0005 | B | 0.125 | 1 | 200 | 1500 | 150 |
| Example 14 | c | 0.0005 | B | 0.125 | 1 | 200 | 1000 | 150 |
| Example 15 | d | 0.0005 | B | 0.125 | 1 | 200 | 1500 | 150 |
| Example 16 | e | 0.0005 | B | 0.125 | 1 | 200 | 1500 | 150 |
| Example 17 | f | 0.0005 | B | 0.125 | 1 | 200 | 1500 | 150 |
| Example 18 | g | 0.0005 | B | 0.125 | 1 | 200 | 1500 | 150 |
| Example 19 | h | 0.0005 | B | 0.125 | 1 | 200 | 1500 | 150 |
| Example 20 | i | 0.0005 | B | 0.125 | 1 | 200 | 1500 | 150 |
| Example 21 | j | 0.0005 | B | 0.125 | 1 | 200 | 1500 | 150 |
| Example 22 | k | 0.0005 | B | 0.125 | 1 | 200 | 1200 | 150 |
| Example 23 | l | 0.001 | B | 0.25 | 1 | 150 | 200 | 140 |
| Example 24 | m | 0.001 | B | 0.25 | 1 | 150 | 200 | 140 |
| Example 25 | n | 0.001 | B | 0.25 | 1 | 200 | 1500 | 150 |
| Example 26 | o | 0.002 | B | 0.5 | 1 | 200 | — | 150 |
| Example 27 | p | 0.001 | B | 0.25 | 1 | 200 | — | 150 |
| Example 28 | q | 0.004 | E | 0.04 | 0.3 | 200 | — | 150 |
| Example 29 | | 0.002 | B | 0.5 | 1 | 200 | — | 150 |

| | Time min | Yield g | Mileage kg/mmol-Zr | $MFR_2$ g/10 min | $MFR_{10}$ g/10 min | $MFR_{10}/MFR_2$ | d kg/m$^3$ | Mw/Mn |
|---|---|---|---|---|---|---|---|---|
| Example 1 | 30 | 59.7 | 59.7 | 1.03 | 7.62 | 7.4 | 898 | 2.12 |
| Example 2 | 10 | 110.7 | 442.8 | 5.37 | 36.00 | 6.7 | 904 | 2.07 |
| Example 3 | 30 | 88.6 | 88.6 | 6.52 | 47.60 | 7.3 | 904 | 2.06 |
| Example 4 | 30 | 79.6 | 159.2 | 1.66 | 10.80 | 6.5 | 905 | 2.15 |
| Example 5 | 10 | 80.3 | 321.2 | 4.31 | 27.20 | 6.3 | 904 | 2.11 |
| Example 6 | 30 | 35 | 35.0 | 7.23 | | | 905 | |

TABLE 1-continued

| | | | | | | | | |
|---|---|---|---|---|---|---|---|---|
| Example 7 | 8 | 65.8 | 131.6 | 2.80 | | | 874 | |
| Example 8 | 10 | 85 | 170.0 | 0.79 | | | 865 | |
| Example 9 | 10 | 35 | 35.0 | 3.23 | | | 938 | |
| Example 10 | 10 | 13.9 | 13.9 | 13.90 | | | 947 | |
| Example 11 | 30 | 59.8 | 29.9 | 1.04 | 9.26 | 8.9 | 895 | 2.11 |
| Example 12 | 10 | 119.5 | 119.5 | 0.42 | 899 | | | |
| Example 13 | 30 | 69.8 | 139.6 | 1.18 | 7.55 | 6.4 | 902 | 2.19 |
| Example 14 | 30 | 50.6 | 101.2 | 2.01 | 904 | | | |
| Example 15 | 30 | 70.4 | 140.8 | 1.80 | 12.60 | 7 | 903 | 2.15 |
| Example 16 | 30 | 75.9 | 151.8 | 1.09 | 7.40 | 6.8 | 902 | 2.08 |
| Example 17 | 30 | 44.8 | 89.6 | 4.90 | | | 902 | |
| Example 18 | 30 | 48.4 | 96.8 | 2.79 | | | 904 | |
| Example 19 | 30 | 33 | 66.0 | 1.82 | | | 903 | |
| Example 20 | 30 | 62.4 | 124.8 | 3.22 | | | | |
| Example 21 | 30 | 67.9 | 135.8 | 2.15 | | | | |
| Example 22 | 30 | 32.5 | 65.0 | 1.21 | | | 904 | |
| Example 23 | 30 | 64.9 | 64.9 | 1.80 | | | | |
| Example 24 | 30 | 80.9 | 80.9 | 1.40 | | | | |
| Example 25 | 30 | 74.2 | 74.2 | 2.50 | | | | |
| Example 26 | 30 | 75.9 | 38.0 | 9.10 | 66.00 | 7.2 | 905 | 2.19 |
| Example 27 | 30 | 30.9 | 30.9 | 3.29 | | | | |
| Example 28 | 30 | 18.9 | 4.7 | 14.90 | 100.00 | 6.7 | 905 | 2.08 |
| Example 29 | 30 | 97.5 | 48.8 | 7.84 | 56.50 | 7.2 | 908 | 2.15 |

note 1) As component (b3), triisobutylaluminum was used.
note 2) As component (a), the following metallocene compounds were used.
a: di(p-tolyl)methylene(cyclopentadienyl)(octamethyloctahydrodibenzofluorenyl) zirconiumdichloride
b: di(1-naphthyl)methylene(cyclopentadienyl)(octamethyloctahydrodibenzofluorenyl) zirconiumdichloride
c: diphenylmethylene(cyclopentadienyl)(octamethyloctahydrodibenzofluorenyl) zirconiumdichloride
d: di(p-tert-butyl-phenyl)methylene(cyclopentadienyl) (octamethyloctahydrodibenzofluorenyl)zirconiumdichloride
e: di(m-trifluoromethyl-phenyl)methylene(cyclopentadienyl) (octamethyloctahydrodibenzofluorenyl)zirconiumdichloride
f: di(p-chloro-phenyl)methylene(cyclopentadienyl)(octamethyloctahydrodibenzofluorenyl)zirconiumdichloride
g: di(p-biphenyl)methylene(cyclopentadienyl)(octamethyloctahydrodibenzofluorenyl) zirconiumdichloride
h: di(p-trifluoromethyl-phenyl)methylene(cyclopentadienyl) (octamethyloctahydrodibenzofluorenyl)zirconiumdichloride
i: di(p-tolyl)methylene(cyclopentadienyl)(2,7-dimethyl-3,6-di-tert-butylfluorenyl) zirconiumdichloride
j: di(p-tolyl)methylene(cyclopentadienyl)(1,1',3,6,8,8'-hexamethyl-2,7-dihydrodicyclopentafluorenyl)zirconiumdichloride
k: di(p-tolyl)methylene(cyclopentadienyl)(2,7-di-tert-butylfluorenyl)zirconiumdichloride
l: diphenylsilylene(cyclopentadienyl)(2,7-di-tert-butylfluorenyl)zirconiumdichloride
m: diphenylsilylene(cyclopentadienyl)(octamethyloctahydrodibenzofluorenyl)zirconiumdichloride
n: di(p-tolyl)methylene(cyclopentadienyl)(2,7-diphenyl-3,6-di-tert-butylfluorenyl) zirconiumdichloride
o: di(m-trifluoromethyl-phenyl)methylene(3-methyl-5-tert-butylcyclopentadienyl) (2,7-di-tert-butylfluorenyl)zirconiumdichloride
p: diphenylmethylene(3-ethyl-5-tert-butylcyclopentadienyl)(2,7-di-tert-butylfluorenyl) zirconiumdichloride
q: diphenylmethylene(3-methyl-5-tert-butylcyclopentadienyl)(2,7-di-tert-butylfluorenyl) zirconiumdichloride
r: dimethylmethylene(cyclopentadienyl)(fluorenyl)zirconiumdichloride
s: dimethylsilylene(cyclopentadienyl)(fluorenyl)zirconiumdichloride
t: dimethylsilylene(indenyl)(fluorenyl)zirconiumdichloride
u: (tert-butylamide)(dimethyl)(tetramethyl-η5-cyclopentadienyl)silanedichlorotitanium
note 3) As component (b2) or component (b3), the following compounds were used.
A: N,N-dimethylaniliniumtetrakis(pentafluorophenyl)borate
B: MAO made by Albermarle Corporation
C: MMAO made by Tosoh Finechem Corporation
D: TMAO-341 made by Tosoh Finechem Corporation
E: Triphenylcarbeniuimtetrakis(pentafluorophenyl)borate
note 4) 1-Octene

INDUSTRIAL APPLICABILITY

An olefin polymer having a high comonomer content, a narrow composition distribution, and a narrow molecular weight distribution in a copolymer can be produced efficiently with high polymerization activity under the conditions of high temperature in the range between 120 and 300° C. by the method of high temperature solution polymerization of the present invention. The olefin polymer produced is a raw material resin that is useful in the field of various forming materials, and the impact of the method of high temperature solution polymerization of the present invention on the industry is immense.

The invention claimed is:

1. A process for producing an olefin polymer, comprising:

carrying out solution polymerization of ethylene and one or more kinds of monomers selected from α-olefins at a temperature ranging from 120 to 300° C., in the presence of a catalyst for olefin polymerization, said catalyst comprising:

(A) a bridged metallocene compound represented by the general formula [I] described below,

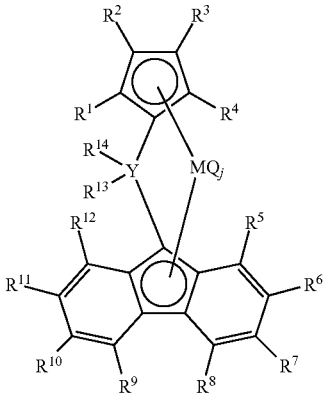

wherein $R^1$, $R^2$, $R^3$, $R^4$, $R^5$, $R^8$, $R^9$ and $R^{12}$ are each a hydrogen atom, a hydrocarbon group, or a silicon-containing group, and may be identical or different, or neighboring groups may be bonded together to form a ring structure;

$R^6$ and $R^{11}$ are identical and are each a hydrocarbon group or a silicon-containing group[, or may be bonded together to form a ring structure];

$R^7$ and $R^{10}$ are identical to each other and are each a hydrocarbon group or a silicon-containing group[, or may be bonded together to form a ring structure];

*$R^6$ and $R^7$ may be combined to form a ring structure;*

*$R^{10}$ and $R^{11}$ may be combined to form a ring structure;*

$R^{13}$ and $R^{14}$ are each an aryl group, and may be identical or different;

M is Ti, Zr or Hf;

Y represents carbon or silicon;

Q represents halogen, a hydrocarbon group, an anionic ligand, or a lone electron pair, and may be selected from an identical or different combination of neutral ligands capable of coordination; and j is an integer of 1 to 4, and (B) at least one compound selected from the group consisting of (b-1) an organoaluminum oxy compound, (b-2) a compound which reacts with the bridged metallocene compound (A) to form an ion pair, and (b-3) an organoaluminum compound.

2. The process of claim 1, wherein M represents Zr or Hf.

3. The process of claim 1, wherein Y in the general formula [I] represents carbon.

* * * * *